United States Patent
Myoung

(10) Patent No.: US 8,206,634 B2
(45) Date of Patent: Jun. 26, 2012

(54) METHOD OF MANUFACTURING A LIGHT GUIDING PANEL AND AN APPARATUS FOR THE SAME, AND A PARTICLE BLASTING APPARATUS FOR MANUFACTURING THE LIGHT GUIDING PANEL

(76) Inventor: Bum Young Myoung, Inchun (KR)

( * ) Notice: Subject to any disclaimer, the term of this patent is extended or adjusted under 35 U.S.C. 154(b) by 1416 days.

(21) Appl. No.: 10/509,819

(22) PCT Filed: Nov. 26, 2002

(86) PCT No.: PCT/KR02/02216
§ 371 (c)(1),
(2), (4) Date: Sep. 30, 2004

(87) PCT Pub. No.: WO03/083562
PCT Pub. Date: Oct. 9, 2003

(65) Prior Publication Data
US 2005/0213021 A1    Sep. 29, 2005

(30) Foreign Application Priority Data
Apr. 1, 2002  (KR) .................... 10-2002-0017843

(51) Int. Cl.
*B29D 11/00* (2006.01)
(52) U.S. Cl. .............. 264/284; 264/2.7; 451/75; 451/80
(58) Field of Classification Search ............. 451/75, 451/80, 87, 99; 264/2.7, 284
See application file for complete search history.

(56) References Cited

U.S. PATENT DOCUMENTS

| | | | |
|---|---|---|---|
| 4,995,198 A * | 2/1991 | Zupanick | 451/38 |
| 6,200,203 B1 * | 3/2001 | Xu et al. | 451/99 |
| 6,243,150 B1 * | 6/2001 | Watanabe et al. | 349/65 |
| 6,320,639 B1 | 11/2001 | Mori et al. | 349/155 |

FOREIGN PATENT DOCUMENTS

| | | |
|---|---|---|
| JP | H05-116070 | 5/1993 |
| JP | H13-157966 | 6/2001 |
| KR | 1991-0006784 B1 | 9/1991 |
| KR | 10-241671 B1 | 2/2000 |
| KR | 2002-0002292 A | 1/2002 |

OTHER PUBLICATIONS

Shigehiko et al., JP 05-116070, "Continuous wet type sand blast machining apparatus", Machine Translation, May 14, 1993.*

* cited by examiner

*Primary Examiner* — Christina Johnson
*Assistant Examiner* — Galen Hauth

(57) ABSTRACT

Disclosed are a method of manufacturing a light guiding panel by means of carving fine engravings on a surface of a transparent substrate by plasting fine particles and an apparatus for the same. A distributed degree of the engravings gradually increases as they become far away from a light source position. The light guiding panel which has been so manufactured does not need a diffusion sheet and has a good brightness uniformity and a good light effectiveness.

9 Claims, 24 Drawing Sheets

FIG. 11

| RECESS DISTRIBUTION | | | | |
|---|---|---|---|---|
| | | 35x | 35y | 35z |
| DISTRIBUTION PHOTO | | | | |
| RECESS SIZE (μm) | | 10 ~ 40 | 15 ~ 50 | 20 ~ 60 |
| RECESS DEPTH (μm) | | 100 | 140 | 200 |
| DISTRIBUTION (ea/mm²) | | 54 | 120 | 180 |

METHOD OF MANUFACTURING A LIGHT GUIDING PANEL AND AN APPARATUS FOR THE SAME, AND A PARTICLE BLASTING APPARATUS FOR MANUFACTURING THE LIGHT GUIDING PANEL

CROSS REFERENCE TO RELATED APPLICATION

This is a U.S. National stage of application No. PCT/KR02/002216, filed on 26 Nov. 2002. Priority is claimed on that application and on the following application:
  Country: Korea, Application No. 10-2002-0017843, Filed: Apr. 1, 2002

The PCT International application was published in the English language.

TECHNICAL FIELD

The present invention relates to a light guiding panel, and more particularly, to a method and an apparatus for manufacturing a light guiding panel and a particle blasting apparatus for the same.

BACKGROUND ART

A light guiding panel is one of core elements forming a backlight unit. The backlight unit converts light of a tube lamp into light of flat optical sources and is widely used in an apparatus, such as a liquid crystal display (LCD) panel or an advertising display apparatus, which requires a flat light source.

Methods for forming a backlight unit are broken down to a direct-type method and a light guiding panel method according to the location of an optical source. The direct-type method places the optical source directly below a light emitting surface so as to guarantee planar light emission, while the light guiding panel method places an optical source at a side of a light guiding panel so that light which is incident on the side of the panel is guided to be reflected to the front surface of the light guiding panel in order to guarantee planar light emission. The present invention is applied to the light guiding panel method.

A conventional light guiding type backlight unit is comprised of at least a tube type fluorescent lamp, several sheets such as a reflection sheet, a light guiding panel, a diffusion sheet, and a prism sheet, and a mold frame by which the foregoing elements can be assembled into a unit. Among these elements, the light guiding panel is a core element and is made of a transparent acryl resin plate. Light emitted by a tube lamp which is provided along a side of the light guiding lamp, is incident on the side of the panel and then is reflected to the front surface of the light guiding panel by a specific pattern on a bottom surface of the acryl resin plate. The reflection sheet makes the light having passed through the bottom surface of the light guiding panel be reflected into inside of the light guiding panel. The diffusion sheet is put on the front surface of the light guiding panel and makes the light from the front surface be scattered uniformly such that an appropriate amount of light is made to be spread over the front side of the light guiding panel. The prism sheet makes the light from the diffusion sheet be refracted and collected such that the brightness of the surface of the backlight unit can be enhanced.

Among conventional light guiding panel manufacturing technologies, there is a dot pattern printing method using a silkscreen printing technology. In the silkscreen printing method, dots are formed on the bottom surface of a light guiding panel by a silkscreen printing method and minute glass beads are put inside the dots such that light is scattered on the surfaces of glass beads and scattered light passes the top surface of the light guiding panel. This method is a stable technology that has been used for tens of years, but the resolution of a film, and the kind, tension, and angle of gauze during an engraving process are closely related to the dot size and pitch of a light guiding panel desired to be printed. Accordingly, identifying and adjusting these correlations need much know-how. In addition, the printing process is complex and many defections may occur during the printing process. There is another conventional light guiding panel manufacturing technology, or a V-cut method, which uses a machine tool. In the V-cut method, V-shaped grooves are directly made on a transparent acryl resin substrate by a machine tool.

However, in the light guiding panels made by the dot pattern printing method or V-cut method, the scatter light reflected by the dots or V-grooves is emitted to the front surface of the light guiding panel such that the reflection pattern is seen as is on the light guiding panel. That is, since the reflection pattern, which is the reflected dots or V-grooves, is of a size enough to be seen with the naked eye, so-called light spots, in which bright parts or dark parts are locally mixed and coexisting, appear on the front surface of the light guiding panel. In order to remove or minimize the light spots, sheets such as a diffusion sheet, which is made from polymer material being mixed with minute beads, or a prism sheet is generally attached on the front surface of a light guiding panel. If a diffusion sheet is used, an appropriate amount of light is made to be spread such that the uniformity of brightness can improve. However, since the light transmission factor of a diffusion sheet is usually about 68%, employing a diffusion sheet and the like causes an adverse effect of light loss, the optical efficiency is degraded, and the brightness of the backlight is lowered, accordingly. In order to improve optical efficiency, a light guiding panel which does not need a diffusion sheet and the like is required.

For this, a variety of research activities, have been proceeding recently, including researches on a method for directly molding a light guiding panel having a light scattering function by using a mold for manufacturing a transparent resin substrate which is part of a light guiding panel, the mold whose surface is processed by laser, sandblast, or erosion. However, the market related to manufacturing a light guiding panel demands establishment of a mass production system according to automation of light guiding panel production and achievement of production cost reduction no less than achieving the uniformity and stability of brightness distribution of light emitting from a light guiding panel. The conventional technologies for manufacturing light guiding panels cannot satisfy these demands well.

DISCLOSURE OF INVENTION

It is a first objective of the present invention to provide a light guiding panel manufacturing method by which in order to produce a light guiding panel, minute recesses are formed on a transparent substrate as a gradation pattern considering the installation position of an optical source such that high uniformity of brightness and optical efficiency can be obtained.

It is a second objective of the present invention to provide a light guiding panel manufacturing method by which light guiding panels can be mass-produced by automation of production processes, and a particle injection apparatus and a manufacturing apparatus therefor.

According to an aspect of the present invention to achieve the objectives, a light guiding panel is manufactured by forming minute recesses on the surface of a transparent substrate through high speed injection of minute particles. Particles are injected slanted to or perpendicular to the substrate surface, and minutes recesses are formed such that distribution density and/or size or depth of recesses gradually increase as a distance from the light incident surface increases.

A method for manufacturing a light guiding panel according to the present invention comprises transferring a transparent substrate that is a raw material for the light guiding panel, so that the substrate passes below an outlet of an injection nozzle at a predetermined speed; making a predetermined amount of minute particles contained in a container free-fall in a unit time; and forming a desired distribution of recesses formed on a surface of the transparent substrate, by mixing the free-falling minute particles with a high speed compressed fluid flow, and injecting the mixed particles on the surface of the transparent substrate being transferred.

According to an embodiment of the method for manufacturing a light guiding panel of the present invention, the minute particles are diffusively injected through an injection nozzle, forming roughly a circle or an oval shape, and the injection nozzle is arranged so that the direction of the outlet of the injection nozzle is roughly perpendicular to the transfer direction of the transparent substrate and slanted to the surface of the transparent substrate at a predetermined angle, and a principle for forming recesses by diffusion of injected minute particles is used such that the density of recesses decreases as the distance between a location on the surface of the transparent substrate and the outlet of the injection nozzle increases.

According to another embodiment of the method for manufacturing a light guiding panel of the present invention, a plurality of the injection nozzles are arranged in a row in the direction across the transfer direction such that groups of minute particles injected from neighboring injection nozzles are connected in a row in the width direction of the transparent substrate. Also, in order to achieve smooth changes of recess distribution density, during an injection process the plurality of injection nozzles are made to swing in the direction across the transfer direction of the transparent substrate According to still another embodiment of the method for manufacturing a light guiding panel of the present invention, the minute particles are injected through an injection pipe in which the thickness of the internal shape of the injection pipe decreases and the width of the internal shape increases in the direction from the entrance to the outlet of the injection pipe. The injected minute particle group forms a belt shape having a long width and a thickness which is relatively less than the width and the changing trend in the width direction of distribution density of recesses to be formed on the transparent substrate corresponds to the changing trend of a unit area in the width direction of the belt.

Preferably, the light guiding panel manufacturing method further comprises varying the transfer speed of the transparent substrate with respect to distribution of the recesses in the transfer direction of the transparent substrate.

When a light guiding panel is manufactured, maintaining a constant amount of injected minute particles in a unit time is advantageous for controlling the distribution density of recesses. In each of the methods of the embodiments described above, when minute particles are discharged from the container, the minute particles are made to free-fall such that a constant amount of injected minute particles can be maintained.

Meanwhile, a particle injection apparatus for manufacturing a light guiding panel required for performing the light guiding panel manufacturing method is provided. According to an embodiment of the particle injection apparatus, there is provided a particle injection apparatus for manufacturing a light guiding panel, comprising a container which stores minute particles and discharges a predetermined amount of minute particles in a unit time through a bottom outlet in a free-falling method; a connection member which is connected to a bottom outlet of the container and provides a falling path of the minute particles; a pressure fluid supply unit which supplies high speed compressed fluid through a pipe member; and an injection nozzle unit which is connected to the connection member such that the minute particles fall into an internal cavity, and after the compressed fluid from the pipe member of the pressure fluid supply unit, the pipe member which is extended to the vicinity of the outlet of the cavity, are mixed with minute particles, injects the mixed fluid and particles to the outside through an outlet which is connected to the cavity, wherein a vent hole through which fluid flows in the falling path is formed on a position of a predetermined height of the connection member and a low pressure atmosphere in the cavity and the connection member generated by high speed injection is complemented by fluid flowing in through the vent hole such that the minute particles are made to free-fall in an interval higher than the vent hole.

According to another embodiment of the particle injection apparatus, there is provided a particle injection apparatus for manufacturing a light guiding panel, comprising: a container which stores minute particles and discharges a predetermined amount of minute particles in a unit time through a bottom outlet in a free-falling method; a mixing transfer unit which mixes free-falling minute particles with high speed air and forcibly transfers the mixed particles; and an injection pipe which is a pipe having an entrance and an outlet that are all open, whose entrance is connected to the outlet of the mixing transfer unit, and whose internal section shape shows that the thickness decreases and the width increases in the direction to the outlet, wherein the mixed air and minute particles flowing in through the transfer pipe are injected through the outlet of the injection pipe.

In addition, there is provided a light guiding panel manufacturing apparatus using the particle injection apparatus described above. The light guiding panel manufacturing apparatus of the present invention comprises a transfer apparatus which places a transparent substrate that is a raw material of the light guiding panel, on a transfer line and transfers the transparent substrate at a predetermined transfer speed; and a particle injection apparatus which mixes minute particles with a high speed fluid flow, and injects the mixed particles on the surface of the transparent substrate being transferred, through at least one or more injection pipes, such that recesses are formed on the surface of the transparent substrate, wherein the injection amount of the minute particles is constant with respect to time, and the recesses are formed such that distribution density of the recesses gradually increases as a distance from a light incident surface increases.

Preferably, the light guiding panel manufacturing apparatus further comprises a control unit which automatically controls the entire operations of the transfer apparatus, including the transfer speed of the transparent substrate, according to conditions set by a user.

Preferably, the light guiding panel manufacturing apparatus further comprises at least one sensor which is installed on a predetermined position of the transfer line of the transfer apparatus, and detects the passage of the transparent substrate and provide the information to the control unit.

Furthermore, it is preferable that the light guiding panel manufacturing apparatus further comprises a chamber unit which is arranged on the transfer line of the transfer apparatus, provides a space defined by side walls and a top surface, includes the particle injection apparatus, has an open bottom part exposed to the transparent substrate, and is constructed so that minute particles collided with the transparent substrate fall downward without emitted to the outside; and a particle collecting unit which is arranged below the chamber unit and collects the falling minute particles on one place.

In addition, it is preferable that the light guiding panel manufacturing apparatus further comprises a feedback unit which feeds minute particles collected in the particle collecting unit back to the container of the particle injection apparatus.

Also, it is preferable that the light guiding panel manufacturing apparatus further comprises a dust removing apparatus which connects to and provides a path to the chamber, inhales dust inside the chamber and filters the dust.

BRIEF DESCRIPTION OF DRAWINGS

The above objects and advantages of the present invention will become more apparent by describing in detail preferred embodiments thereof with reference to the attached drawings in which:

FIG. 11 shows microphotographs taken with enlarging the distribution of recesses in three sample areas on a light guiding panel actually processed according to the present invention;

BEST MODE FOR CARRYING OUT THE INVENTION

Hereinafter, the preferred embodiments of the present invention will be explained in detail with reference to the accompanying drawings.

Figure 1A:
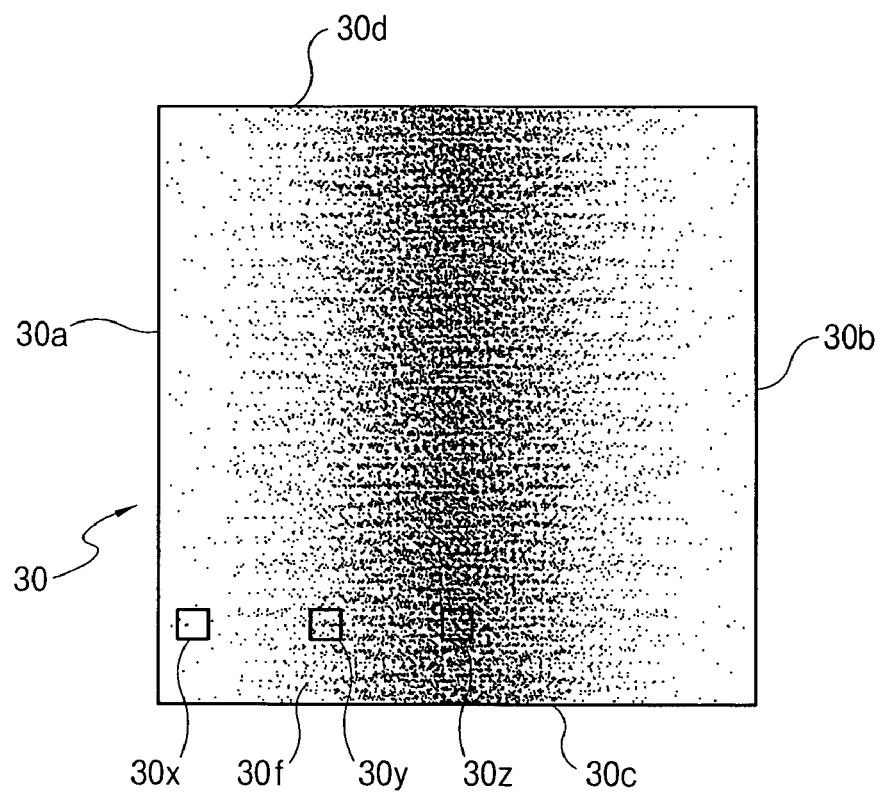
FIGS. 1a and 1b are diagrams of light guiding panels having minute recesses formed thereon according to the present invention.
Figure 1B:
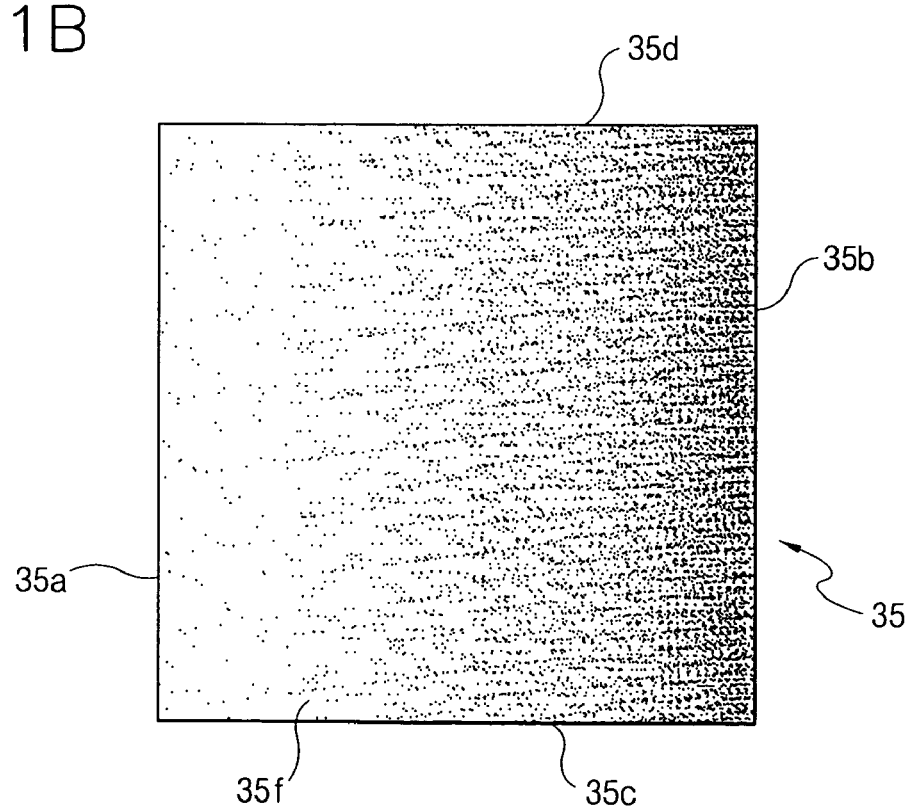

The present invention is based on a concept to form minute recesses as a gradation pattern on a surface of a light guiding panel. FIGS. 1a and 1b show a light guiding panel processed by a manufacturing method of the present invention. The distribution of recesses formed on the light guiding panel varies depending on light incidence methods. In the light guiding panel 30 of FIG. 1a, two sides 30a and 30b of the light guiding panel 30 are light incidence surfaces, while in the light guiding panel 35 of FIG. 1b, one side 35a of the light guiding panel 35 is a light incidence surface. In order to obtain a uniform distribution of brightness over the surface 30f or 35f of the light guiding panel, it is preferred that the distribution of recesses gradually increases as a distance from a light incident side of the light guiding panel increases.

Figure 2:
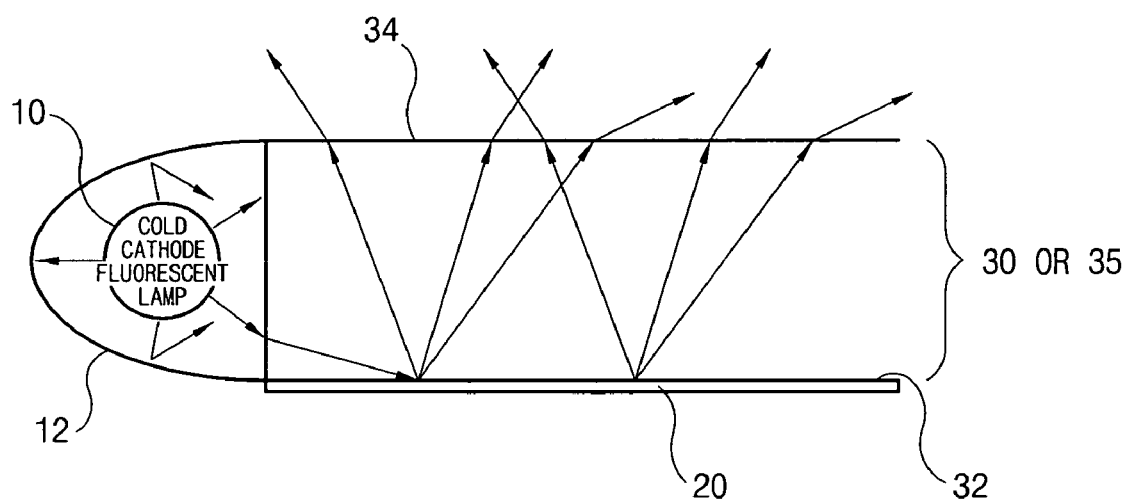
FIG. 2 is an exemplary configuration of a backlight unit which employs the light guiding panel of the present invention.

FIG. 2 shows a backlight unit in which an optical source, for example, a cold cathode fluorescent lamp 10, and a reflection hat 12 is disposed parallel to and along one side or opposite two sides of the light guiding panel 30 or 35 according to the present invention, and a reflection sheet 20 is attached to the bottom surface of the light guiding panel 30 or 35. When the light originated by the fluorescent lamp 10 is incident on the bottom of the light guiding panel 30 or 35, the light is irregularly scattered by the recesses and almost of the light is guided toward a front 34 of the light guiding panel 30 or 35. An almost uniform distribution of brightness can be obtained from an overall surface of the front of the light guiding panel 30 or 35.

Figure 3:
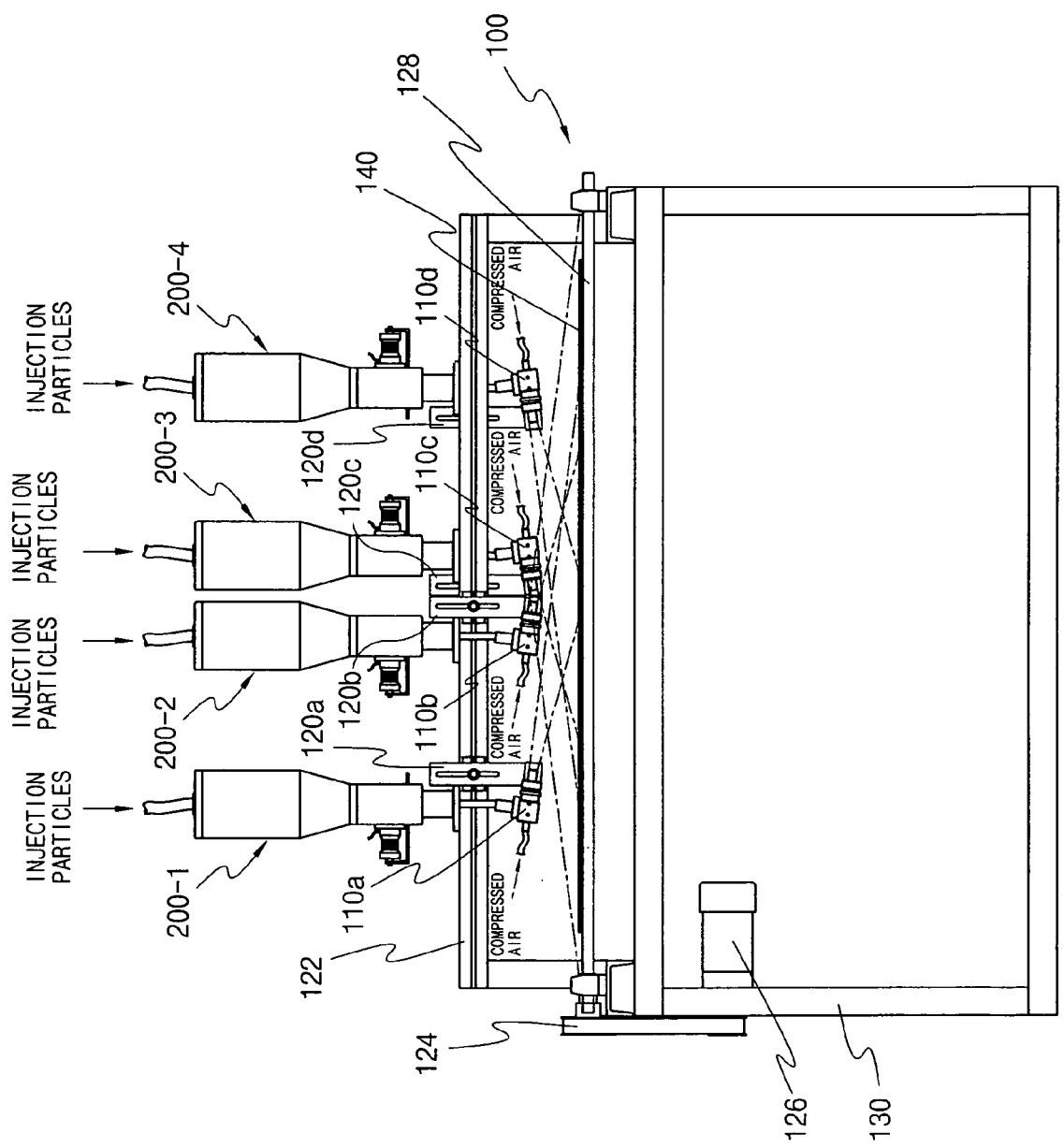
FIG. 3 is a front view of the structure of a light guiding panel manufacturing apparatus according to a first preferred embodiment of the present invention.
Figure 4:
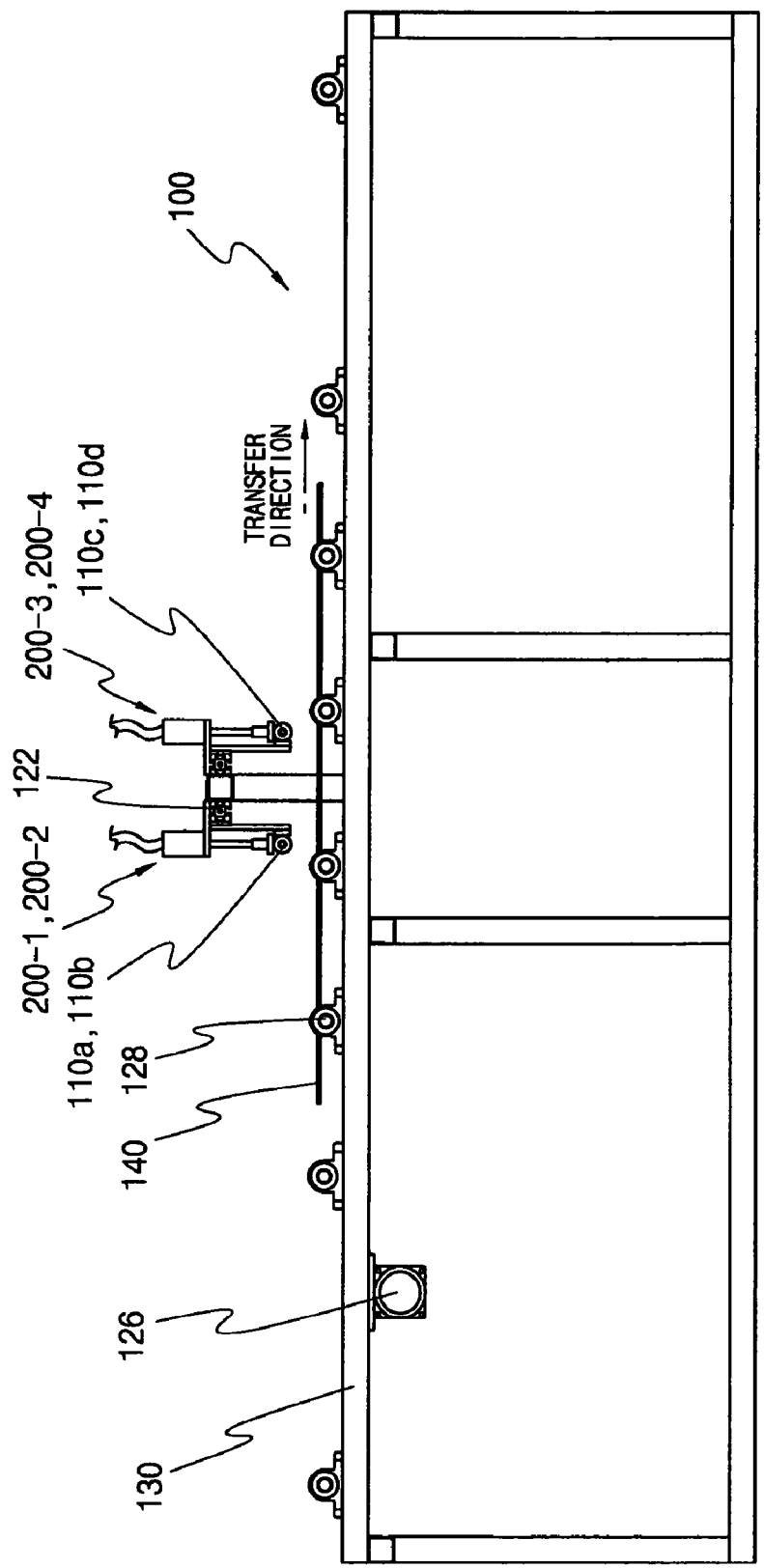
FIG. 4 is a side view of the apparatus shown in FIG. 3.
Figure 5:
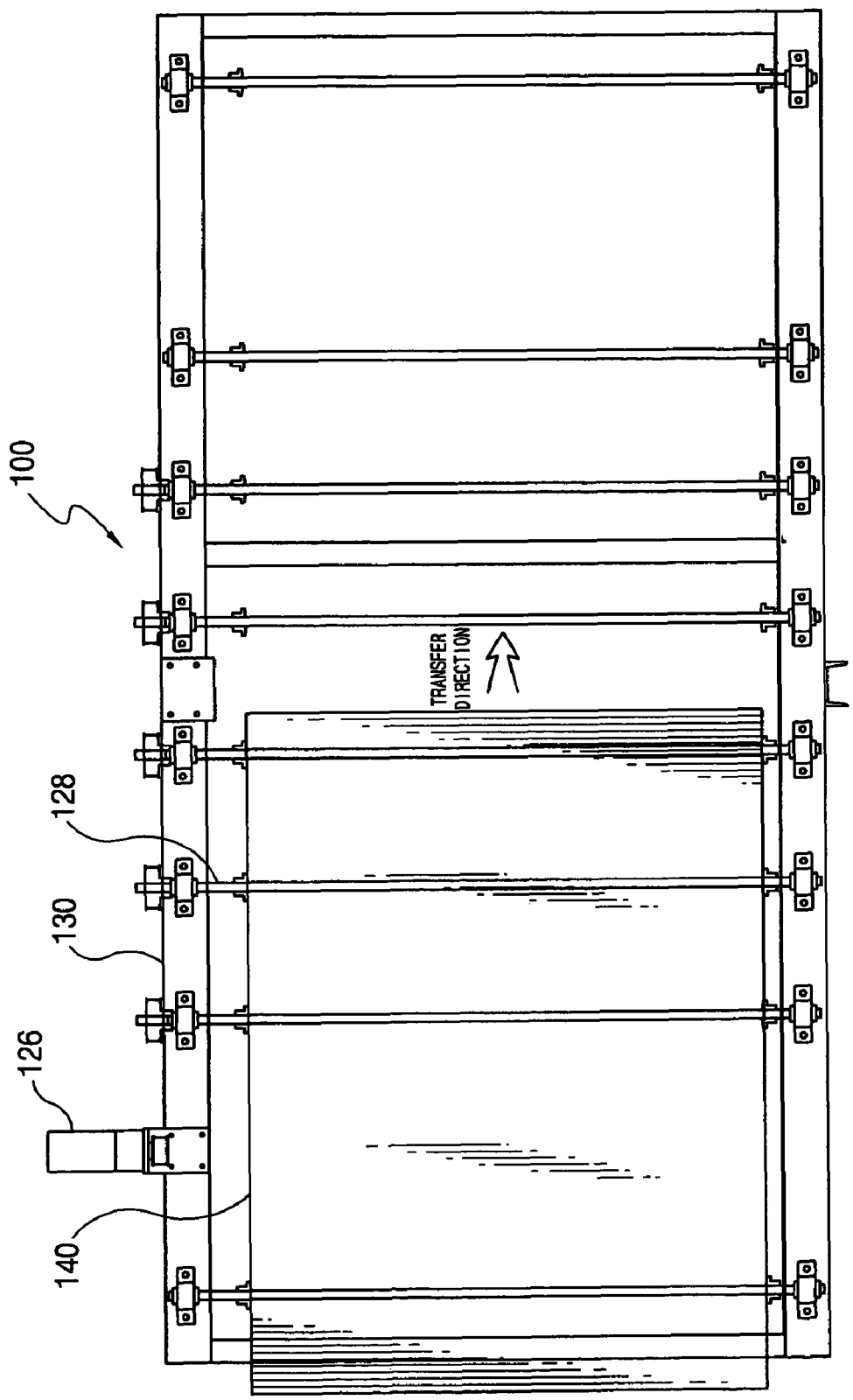
FIG. 5 is a plane view showing a state where a transparent substrate is placed on a transfer apparatus of the manufacturing apparatus shown in FIG. 3.

In connection with the configuration of a the light guiding panel manufacturing apparatus by which the recesses can be processed, a first embodiment of the present invention will now be explained at first. The manufacturing apparatus of the first embodiment is shown in FIGS. 3 through 5. The manufacturing apparatus of the first embodiment employs a slantly and diffusively blasting method using injection nozzles, and broadly comprises a transfer apparatus 100 and one or more particle injection apparatuses 200-1 through 200-4. The number of particle injection apparatuses can be determined appropriately with respect to size of a transparent substrate 140.

The transfer apparatus 100 places the transparent substrate 140 on a transfer line formed with a plurality of transfer bars 128 and transfers the transparent substrate 140 at a predetermined speed. By employing the transfer apparatus 100, mass processing of light guiding panels is enabled. The transfer apparatus 100 can be constructed as a normal transfer system. More specifically, a motor 126 for supplying transfer power is installed at an appropriate location on the transfer apparatus body unit 130, and on the body unit 130, a plurality of transfer bars 128 are installed in parallel to form a transfer line. Combined to the axis of the motor 126 by a power transfer belt 124, each transfer bar 128 rotates by the rotation power of the motor 126 and the transparent substrate 140 placed on the transfer bars 128 is transferred along the transfer line. In addition to the belt method, a gear method may be employed for transferring the rotation power of the motor 126 to the transfer bars 128.

On the transfer apparatus 100, a horizontal position adjusting bar 122 and vertical position adjusting members 120a through 120d are installed and with these, one or more particle injection apparatuses 200-1 through 200-4 are installed on the transfer apparatus 100. The upper body of an injection nozzle unit 110a through 110d of each injection apparatus is mounted on the horizontal position adjusting bar 122 such that the position can be adjusted in the direction perpendicular to the transfer direction of the transparent substrate 140, and by the vertical position adjusting members 120a through 120d, the injection angle of each injection nozzle unit 110a through 110d can be adjusted up and down. Preferably, the transfer apparatus 100 is constructed so that the transfer speed of the transfer apparatus 100 can be controlled. For this, a driving unit (not shown) for driving the motor 126 may have a function for controlling the rotation speed of the motor 126, or a method by which the transfer speed can be reduced at a part for transferring the power of the motor 126 to the transfer bars 128 may be applied.

Figure 6:
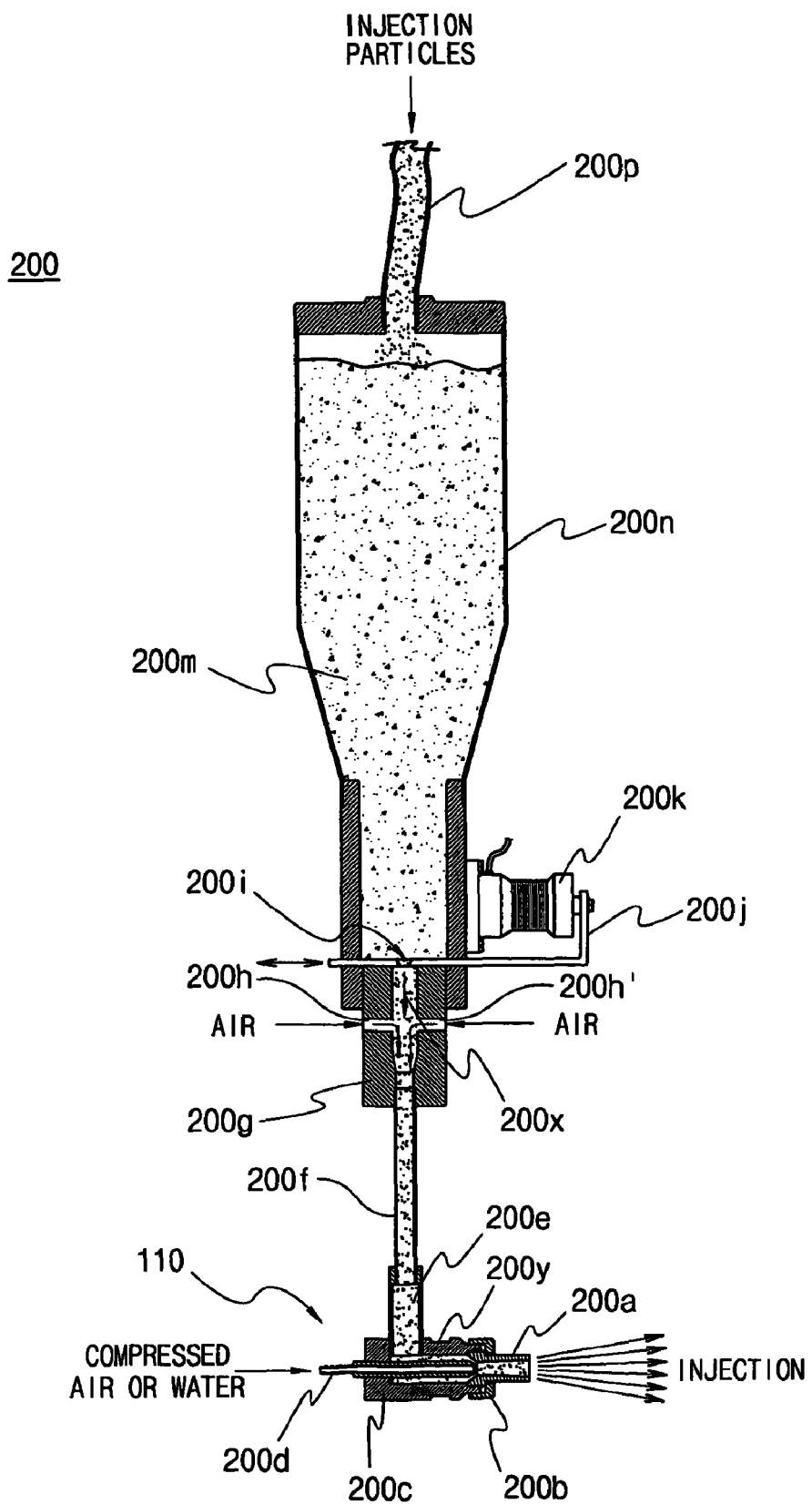
FIG. 6 is a diagram of an example of a particle injection apparatus for manufacturing a light guiding panel, which forms part of the light guiding panel manufacturing apparatus of the present invention.

FIG. 6 is a diagram of an example of a particle injection apparatus 200 used for manufacturing a light guiding panel according to the present invention. The particle injection apparatus 200 comprises a container 200n which stores injection particles 200m; a connection member 200g which is disposed between the bottom aperture of the container 200n and a particle supply pipe 200f and connects the container 200n and the particle supply pipe 200f; and an injection nozzle unit 100 which is connected to the connection member 200g and a pressure fluid supply unit (not shown) which supplies pressure fluid, such as compressed air or water, through the pressure fluid supply pipe 200d and the particle supply pipe 200f. Compared to the compressed air, the compressed water makes particles be injected more straightaway and after particles are injected on a substrate, less dust occurs.

The particle injection apparatus 200 further comprises an opening and shutting unit which is disposed between the top part of the connection member 200g and the bottom aperture of the container 200n, and controls so that only if the particle injection apparatus 200 is operating, the unit opens a path between the container 200n and the connection member 200g and else closes the path. The opening and shutting unit can comprise an opening and shutting plate 200j on which a hole 200i is formed on a predetermined location so that injection particles 200m can fall to the penetration hole 200x of the connection member 200g through the hole 200i; and a driving unit 200k which controls the opening or shutting the hole 200i by moving this opening and shutting plate 200j to the left or to the right.

Particularly, the connection member 200g has a structure in which the penetration hole 200x, which penetrates the center of the connection member 200g in the vertical direction and provides a path between the bottom aperture of the container 200n and the particle supply pipe 200f, and vent holes 200h and 200h', which connect and provide paths between predetermined locations of the sides of the connection member 200g and the penetration hole 200x, are formed.

Preferably, the particle supply pipe 200f is made with a flexible hose so that the injection direction of the injection nozzle 200a can be adjusted as desired.

According to the present embodiment, the injection nozzle unit 110 is installed such that the injection nozzle 200a is slanted to the light incident surface at a predetermined angle when it is seen from directly below the front surface of the transparent substrate 140.

With respect to the structure of the injection nozzle unit 110, one outlet and two entrances are formed on the injection nozzle body 200c and a cavity 200y is formed at the center. At the outlet of the body 200c, the injection nozzle 200a is mounted with an injection nozzle cover 200b as a medium. At a first entrance formed on the opposite side of the outlet of the body 200c, the pressure fluid supply pipe 200d is inserted and extended through the cavity 200y to the entrance of the injection nozzle 200a. To a second entrance formed on the side of the body 200c, a particle supply hole 200e, which connects and provides a path to the particle supply pipe 200f, is coupled.

When thus constructed particle injection apparatus 200 is operating, injection particles are provided through a connection pipe 200p, which is connected to a hopper (not shown) and the like, and are accumulated in the container 200n at first. Since the opening and shutting plate 200j is in an open state at this time, the minute particles of the container 200n are free-falling through the aperture 200i to the penetration hole 200x of the connection member 200g. Particularly, in the interval above the vent holes 200h and 200h' of the penetration hole 200x, injection particles are free-falling. By a low pressure atmosphere generated by high-speed injection of pressure fluid, such as compressed air or water, which is injected to the injection nozzle 200a through the pressure fluid supply pipe 200d, the free-fallen injection particles are forcibly pulled into the cavity 200y through the particle supply pipe 200f and the particle supply hole 200e, and mixed with the pressure fluid and then injected to the outside through the injection nozzle 200a.

Particularly, the particle injection apparatus 200 of the present invention can always maintain a constant amount of injecting particles with respect to time, and the amount of injecting particles in a unit time can be adjusted by the size of the aperture 200i, which are the comparative advantages of the injection apparatus 200 of the present invention over the conventional injection apparatuses. The reason why a constant amount of particles injected through the injection nozzle 200a is always maintained with respect to time is that when injection particles are flowing into the penetration hole 200x of the connection member 200g, injection particles are free-falling in the vertical direction just like the principle of an hourglass. The reason why the injection particles can free-fall is because there are vent holes 200h and 200h' formed on the connection member 200g.

Since minute particles have not so good fluidity due to the characteristic of the minute particles, an injection apparatus using a vacuum inhalation method based on Bernoulli's theorem which is a general injection method has been widely used in the prior art. That is, if a structure for inflow of external air preventing generation of high vacuum is not provided on the path for supplying injection particles, when pressure fluid is injected through the injection nozzle 200a at a high speed, a low pressure atmosphere, that is, high vacuum, is generated. In addition to the gravity of the earth, due to the pressure difference generated by this high vacuum, a power forcibly inhaling the injection particles of the container 200n into the penetration hole 200x of the connection member 200g through the aperture 200i becomes stronger. This forcible inhalation power applies to the entire supply path from the aperture 200i to the injection nozzle 200a. Then, when proceeding along the supply path, the forcibly inhaled particles strike against the wall or collide with other neighboring particles such that the speed changes due to the frictions. Particularly, due to the reason that the amount of pressure fluid supply provided through the pressure fluid supply pipe 200d changes with respect to time, the density in the injection nozzle 200a frequently changes, and the density change causes changes in the pressure of the supply path such that the amount of the minute particles forcibly inhaled from the aperture 200i becomes uneven. Like this, interactions continue. As a result, the amount of minute particles injected from the injection nozzle 200a or the injection speed become uneven and accordingly it is difficult to form recesses as a gradation pattern on the surface of the transparent substrate 140.

However, as in the present invention, if vent holes 200h and 200h' connected to the supply path of particles are formed on the connection member 200g, even when a low pressure atmosphere is generated by the high speed injection of pressure fluid, air is continuously supplied and complemented from the outside through the vent holes 200h and 200h'. Accordingly, the low pressure atmosphere is formed only to the part below the vent holes 200h and 200h' of the penetration hole 200x, the pressure of the atmosphere is also higher than in the conventional method, and particularly, in the interval (marked by an arrow in the figure) above the vent holes 200h and 200h' of the penetration hole 200x, no low pressure atmosphere is generated at all. Therefore, forcible inhalation of particles by the pressure difference does not occur and only free-fall by gravity occurs. After passing the vent holes 200h and 200h', the free-fallen particles are forcibly pulled in a moment and injected through the injection nozzle 200a.

If this free-falling interval is established, injection particles are free-falling just like the principle of an hourglass such that a predetermined amount of particles with respect to the lapse of time can be provided to the particle supply pipe 200f. Accordingly, even though there is momentarily a difference of the amount of minute particles injected from the injection nozzle 200a due to the fact that the amount of pressure fluid provided through the pressure fluid supply pipe 200d changes with respect to time, the constant amount of minute particles for a time with a predetermined length can always be maintained. Furthermore, by adjusting the size of the aperture 200i, the amount of injection can be accurately adjusted. Even when a plurality of injection nozzles are installed, it is easy to precisely control the injection amount of each injection nozzle, and in addition, controllability and time uniformity of the injection amount can improve the uniformity and reproducibility of product quality.

Again referring to FIGS. 3 through 5, it is preferable that the injection nozzle unit 110a through 110d is arranged so that the injection direction is roughly perpendicular to the transfer direction and is slanted to the light incident surface at a predetermined angle when it is seen from the directly below the front surface of the transparent substrate 140.

As material for processing a light guiding panel, a transparent resin substrate 140, for example, an acryl substrate, can be used and the present invention can be widely applied without a particular limitation of the material for a substrate.

As injection particles, particles of aluminum carbide, silicon carbide, zirconia, or diamond can be used, but the examples of usable particles are not limited to these, and any particle whose solidity is higher than that of the material for the transparent substrate such that forming recesses can be performed efficiently can be used without limitations. It is preferable that injection particles with high uniformity of the shape or size are used. One of the most appropriate particles satisfying these requirements is diamond particle. Diamond particles have good fluidity such that supply through free-fall is smoothly performed, and have high uniformity of the size and a low degree of dust generation due to collision of the particles during a process for supply to an injection nozzle. Accordingly using the diamond particles cam ensure a relatively high uniformity of the shape or size of the recesses formed on the transparent substrate 14.

Forming recesses on the surface of the transparent substrate by using the apparatus described above will now be explained. First, the transparent substrate is cut into a desired size and placed on the transfer line of the transfer apparatus 100. By operating the transfer apparatus 100, the transparent substrate 140 is transferred at a predetermined speed and at the same time by operating the injection apparatus 200, particles are injected slantly on the transparent substrate 140. At this time, in order to reduce the so-called H-beam effect in which an edge area of a light guiding panel becomes relatively darker, it can be considered that when particles are injected on an edge part of the transparent substrate 140, the transfer speed is controlled to become relatively lower so that more recesses are formed on the edge area. After the process for forming recesses is finished, the substrate is transferred to next processes of cleansing, drying, and inspection.

Figure 7A:
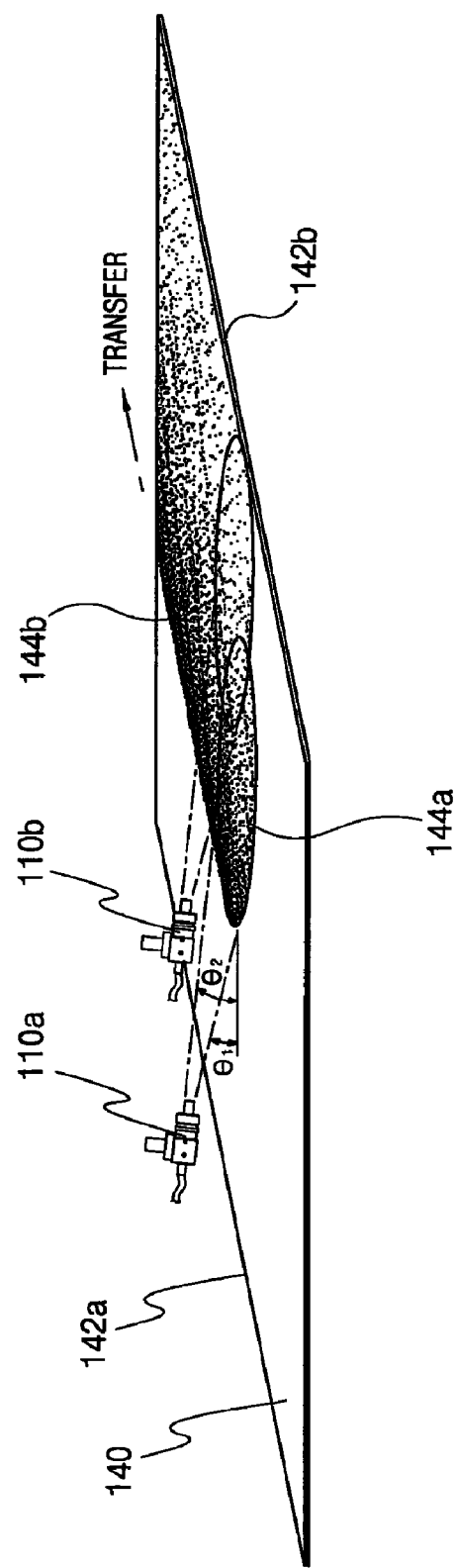
FIGS. 7a and 7b are diagrams for explaining a process for processing the light guiding panel shown in FIG. 1a in which two side surfaces facing each other are surfaces on which light is incident.
Figure 7B:
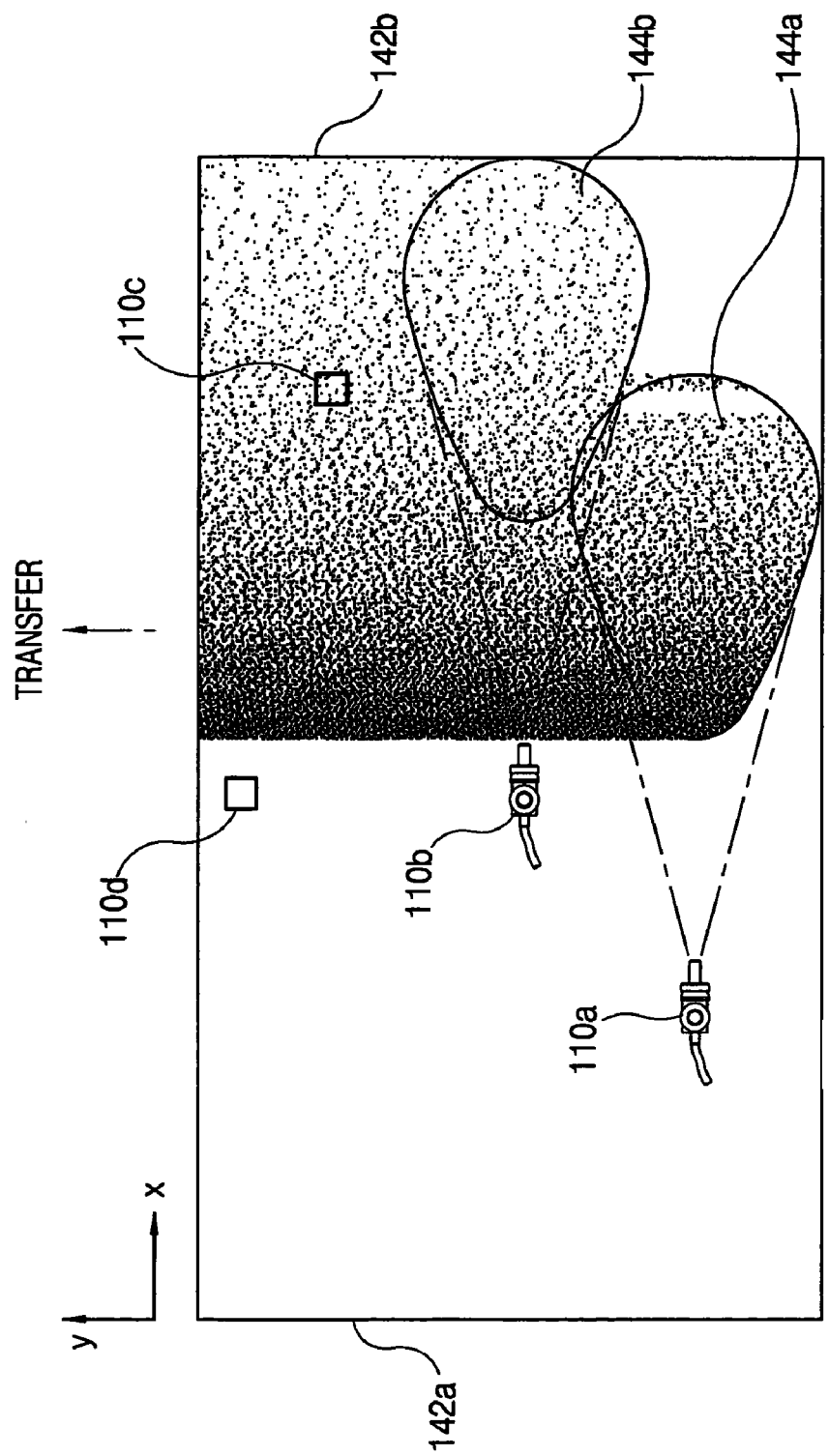

FIGS. 7a and 7b show a process for forming recesses to manufacture a light guiding panel in which light incident surfaces are two surfaces 142a and 142b facing each other as the light guiding panel 30 shown in FIG. 1a. For convenience of description, in FIG. 7a, is shown only that two injection nozzles 110a and 110b inject particles on the right-hand half part of the transparent substrate 140 in the transfer direction. However, other two injection nozzles 110c and 110d actually form recesses on the remaining left-hand half part of the transparent substrate 140 as shown in FIG. 7b. Though the figures show a case where 4 injection nozzles are employed, it is just an example and the number of injection nozzles employed can be determined more or less with respect to size of a transparent substrate to be processed.

The first injection nozzle 110a and the second injection nozzle 110b are located on a diagonal line of an x-y plane and their respective injection areas 144a and 144b are a little overlapping and cover the right-hand half part. The arrangement of the third and fourth injection nozzles 110c and 110d covering the left-hand half part is made to correspond to the arrangement of the first and second injection nozzles 110a and 110b. By thus arranging the injection nozzles 110a and 110b, as one method for increasing the number of recesses as a distance from either of the light incident surfaces 142a and 142b increases, it is preferable that the number of particles injected from each of the first and third injection nozzles 110a and 110c in a unit time is greater than that of particles injected from each of the second and fourth injection nozzles 110b and 110d in a unit time. As another method, the injection pressures of the first and third injection nozzles 110a and 110c may be made to be higher than the injection pressures of the second and fourth injection nozzles 110b and 110d. In addition, the two methods adjusting the injection amount of particles and the injection pressure of the injection nozzles may be combined and then applied.

Each injection nozzle 110a through 110d is installed such that the injection direction is roughly perpendicular to the transfer direction and is slanted to the surface of the transparent surface 140, as described above. If the injection direction is thus slanted, an angle at which minute particles are incident on the transparent substrate 140 decreases as the distance from a minute particle on the transparent substrate 140 to the injection nozzle increases. That is, since $(\pi/2)-\theta_1 > (\pi/2)-\theta_2$, the impact by the minute particle on the transparent substrate 140 also decreases as much. As a result, the size and depth of a recess formed on the surface of the transparent substrate 140 by the injection minute particle also decrease as a distance from the injection nozzle 200a increases. In addition, since particles injected from the injection nozzle are wide spreading while proceeding, the number of recesses on a unit area of the transparent substrate 140, that is, the density of recesses, decreases as a distance from the injection nozzle increases. Accordingly, if the recesses are processed by this method, by a spread effect of the injected particles the density of recesses gradually increases as a distance from the light incident sides 140a or 140b toward the center of the transparent substrate 140 increases.

Figure 8A:
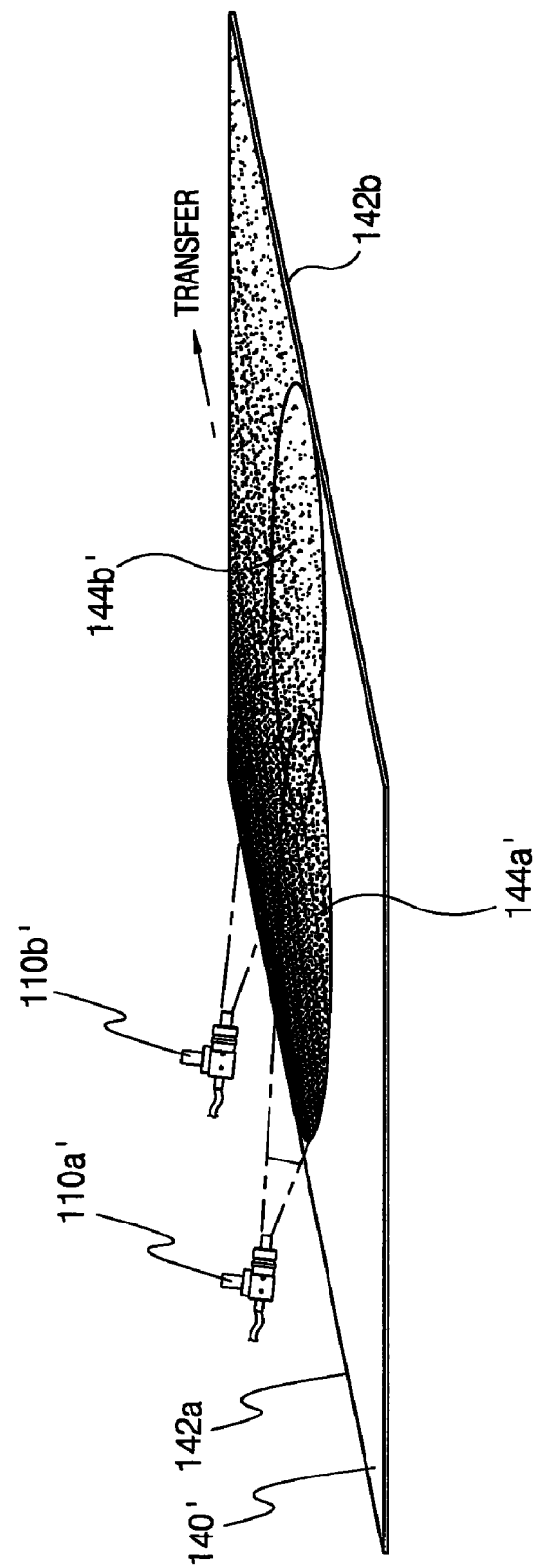
FIGS. 8a through 8c are diagrams for explaining a process for processing the light guiding panel shown in FIG. 1b in which one side surface is a surface on which light is incident.
Figure 8B:
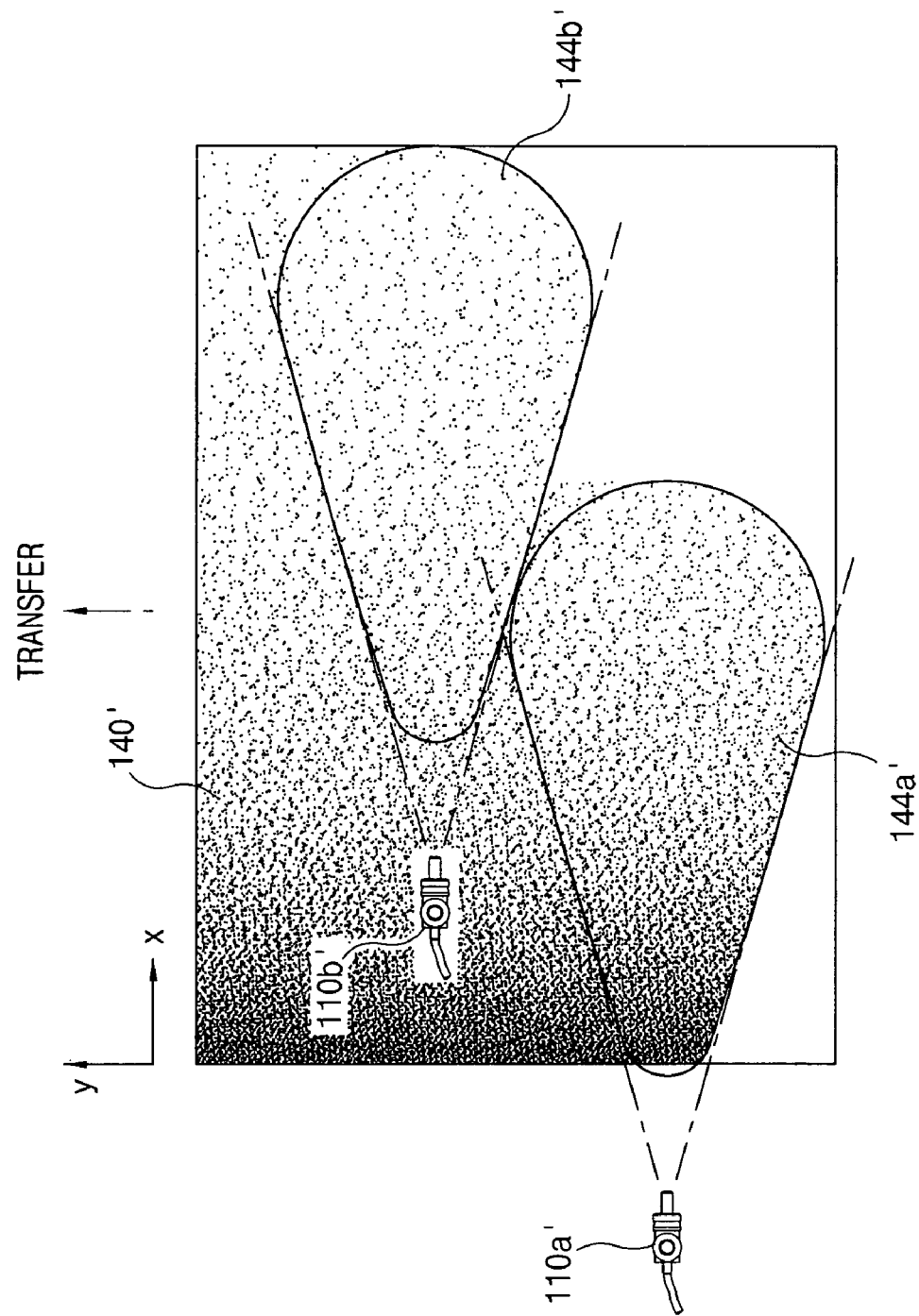
Figure 8C:
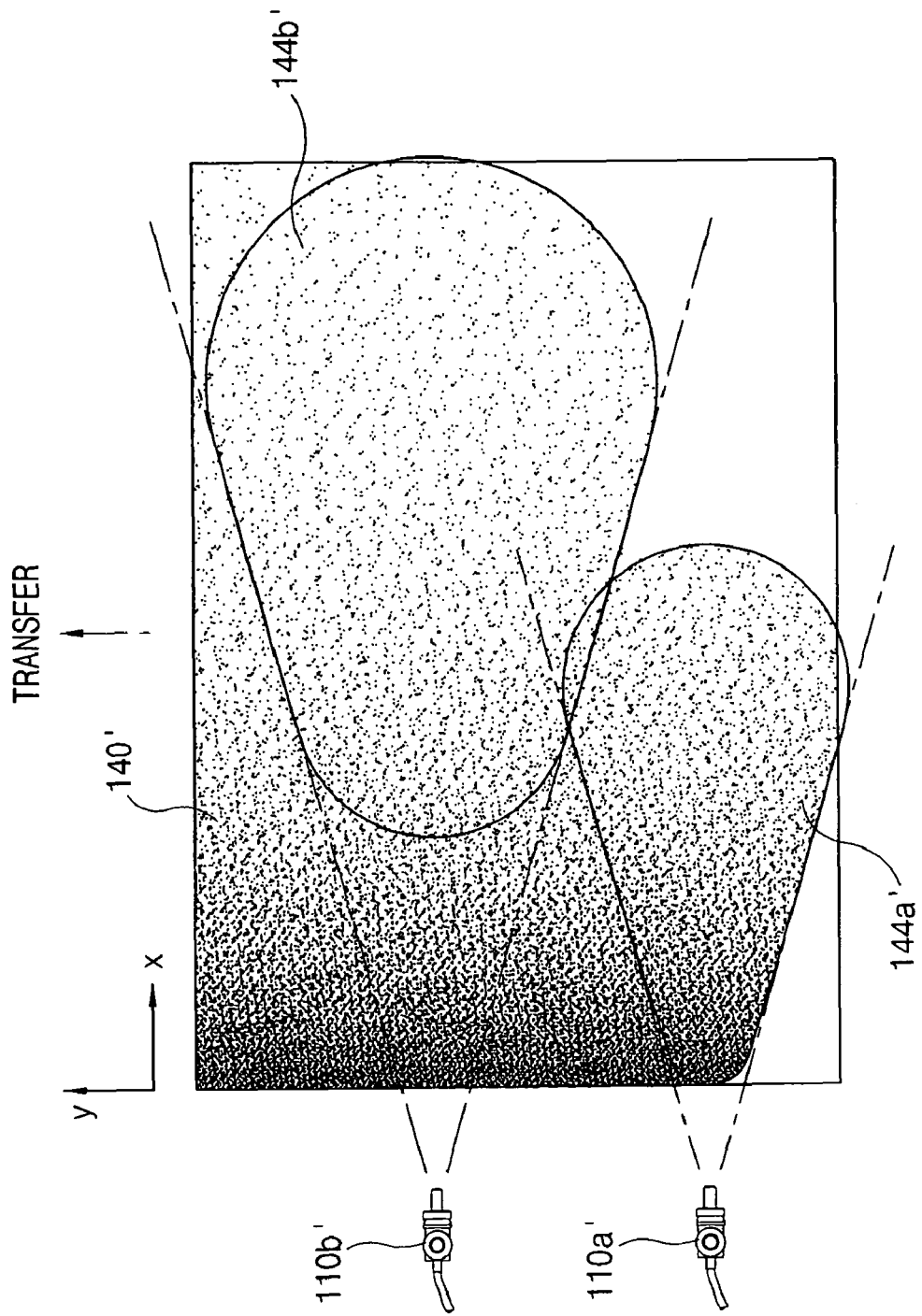

FIGS. 8a through 8c show a process for forming recesses to manufacture a light guiding panel having one light incident surface 142b as shown in FIG. 1b, by using two injection nozzles 110a' and 110b'. If the size of the transparent substrate 140' is small, just one injection nozzle will be enough. The two injection nozzles 110a' and 110b' can be arranged in the diagonal direction on the x-y plane as in FIG. 8b, or in a row in the y-axis direction as in FIG. 8c. When the nozzles are arranged as in FIG. 8c, in order to obtain a gradation pattern of recesses, it is preferable that the injection pressure and/or amount of the second injection nozzle 110b' is less than those of the first injection nozzle 110a'. When the nozzles are arranged as in FIG. 8c, identical injection pressure and amount can be applied to both of the two injection nozzles 110a' and 110b' and if appropriately adjusting the injection angle is considered, it will be enough.

Figure 9:
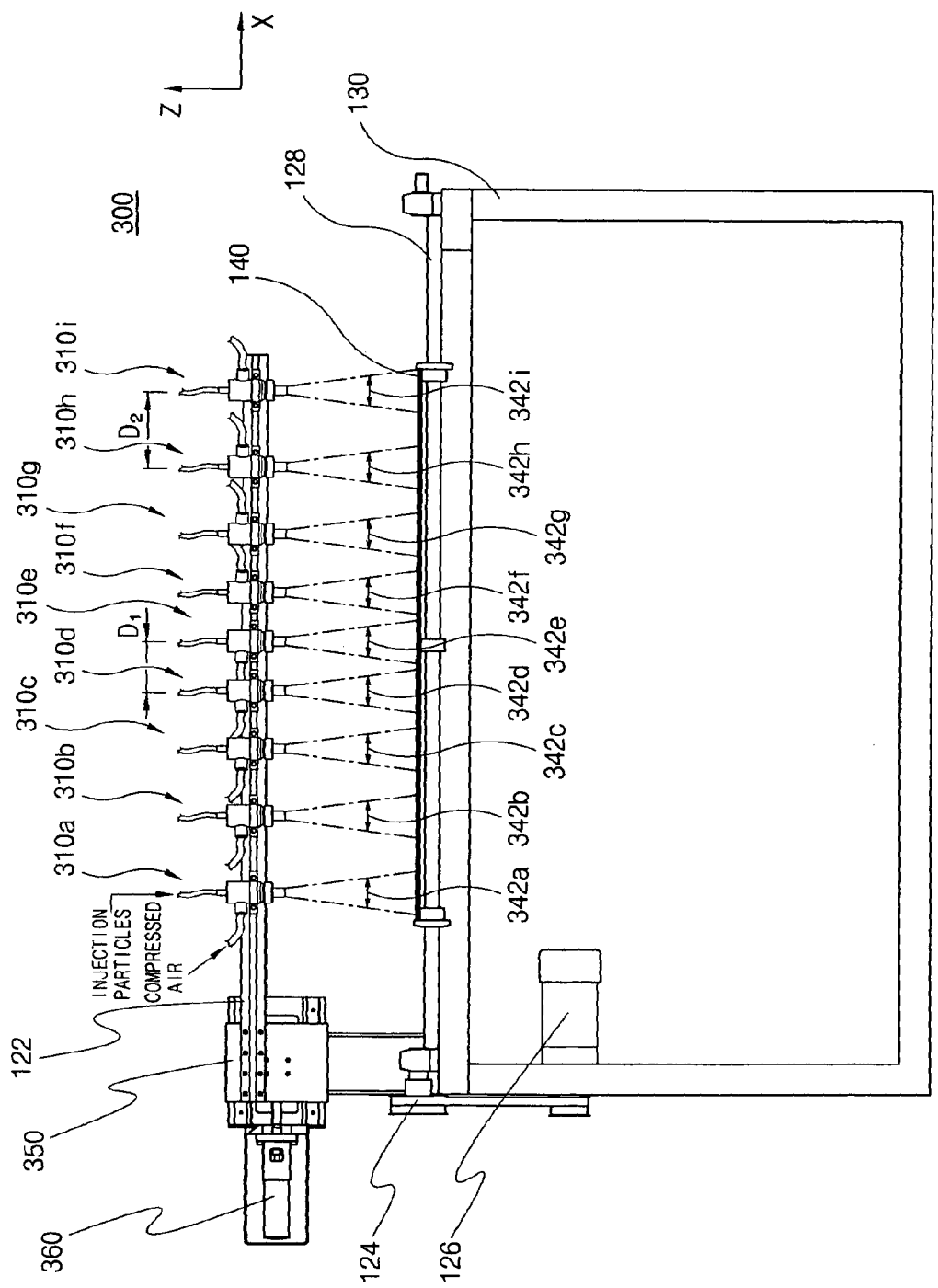
FIG. 9 is a front view of the structure of a light guiding panel manufacturing apparatus according to a second preferred embodiment of the present invention.

Next, a second preferred embodiment of a manufacturing apparatus and process of the present invention will now be explained. FIG. 9 is a diagram of a second preferred embodiment of the structure of a light guiding panel manufacturing apparatus according to the present invention. The second embodiment uses perpendicularly and diffusively blasting method using in-lined nozzles. When compared with the manufacturing apparatus shown in FIGS. 3 through 5 described above, this embodiment of the apparatus has no difference in the structure of the transfer apparatus 100 and has a basic difference in that the injection direction is not slanted to the surface of the transparent substrate 140 and is vertical.

A plurality of injection nozzles 310a through 310i are arranged in a row in the direction perpendicular to the transfer direction of the transfer line on the transfer bars 128. Each injection nozzle 310a through 310i is installed such that the injection is directed right below and is perpendicular to the surface of the transparent substrate 140. In addition, as a method for forming recesses such that the distribution and/or size (or depth) of recesses increase as a distance from the light incident surface increases, the injection nozzles are installed such that the interval between neighboring injection nozzles narrows as a distance from the light incident surface increases. FIG. 9 shows an example of manufacturing a light guiding panel in which both sides are light incident surfaces, and shows the case where the interval D2 of the injection nozzles 310h and 310i close to a side is greater than the interval D1 of the injection nozzles 310d and 310e at the center. The light guiding panel can be manufactured by a method that uses the above-mentioned arrangement and keeps an amount of the injected particles and an injection pressure every injection nozzle uniformly or, alternatively, differently. That is, the interval of the injection nozzles, the injection amount of the particles, and the injection pressure can be adaptively adjusted to accomplish an object of obtaining a desired pattern of the recesses.

As shown in the apparatus of FIG. 9, a blank area on which particles are not injected may occur between neighboring injection nozzles. To reduce the blank areas and generate a gradation pattern of uniform recesses, it is needed to make an injection nozzle swing in the direction perpendicular to the transfer direction when particles are injected. For this, injection nozzles are attached in a row to the horizontal position adjusting bar 122 and the horizontal position adjusting bar 122 is fixed to an LM guide 350, and a servo motor 360 is coupled to the LM guide 350. With this construction, the servo motor 360 swings the LM guide 350 in the direction (linking the left-hand side and the right-hand side in the figure) perpendicular to the transfer direction of the transparent substrate 140 at a predetermined interval. Accordingly, the injection nozzles can inject particles uniformly on the entire surface of the transparent substrate 140 without a blank.

Figure 10:
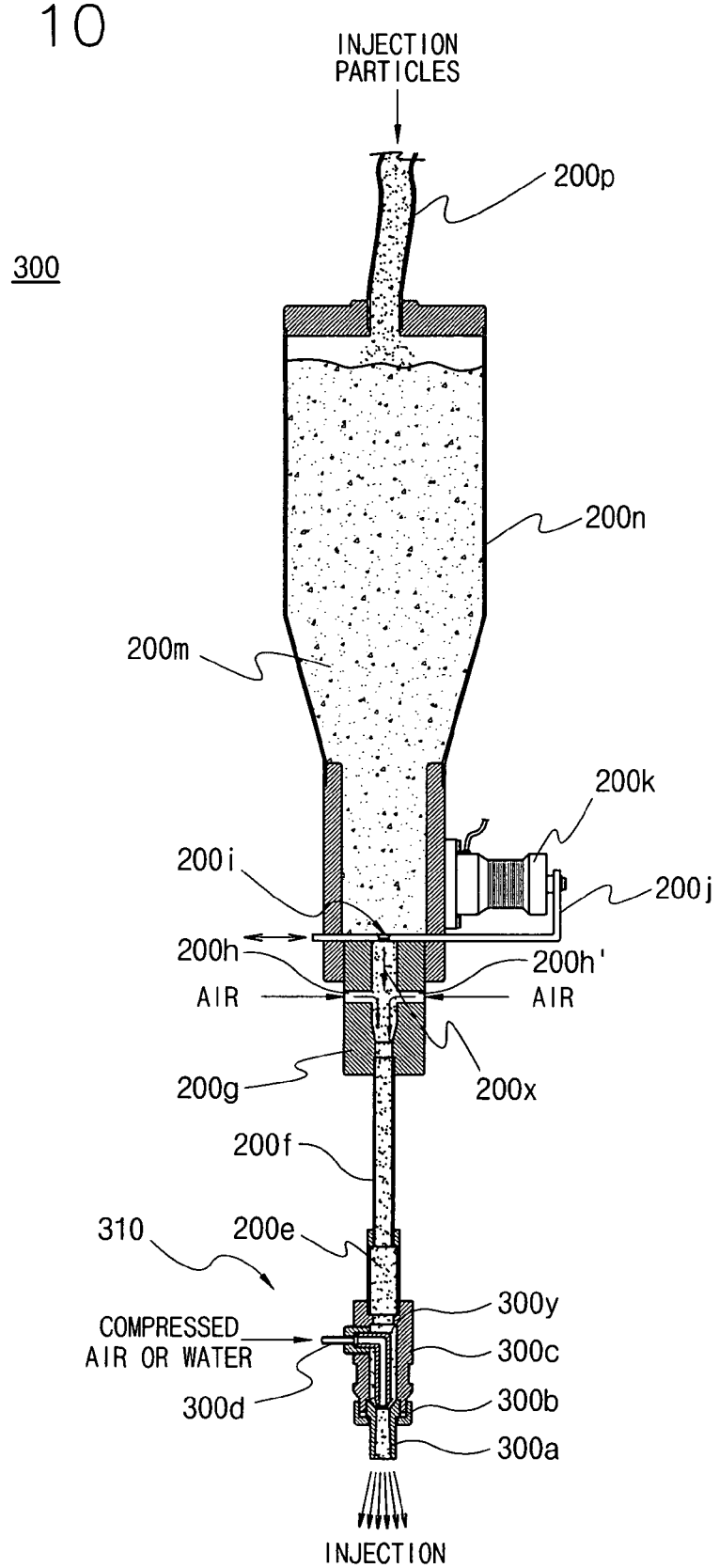
FIG. 10 is a modified example of a particle injection apparatus for manufacturing a light guiding panel, the apparatus applied to the second preferred embodiment.

FIG. 10 shows the structure of a particle injection apparatus 300 that can be applied to this vertical injection method. The particle injection apparatus 300 is different from the particle injection apparatus 200 of FIG. 6 in that the injection nozzle 310 is directed right below. More specifically, the particle supply hole 200e is connected to the back of the injection nozzle body 300c and the pressure fluid supply hole 300d is bent by about 90 degrees and connected to the side of the injection nozzle body 300c. Except this difference, other characteristics, for example, the fact that particles are supplied to the injection nozzle 310 through free-fall, are the same as those of the particle injection apparatus of FIG. 6.

Meanwhile, with an acryl resin substrate with a size of 309 mm×236 mm as the transparent substrate 140, the present inventor carried out the process for forming recesses by using the manufacturing apparatus of the slant injection method shown in FIGS. 3 through 6. The processing conditions of this process were applied as the following table 2:

TABLE 1

| | |
|---|---|
| Transfer speed of acryl substrate | 900 mm/min |

TABLE 1-continued

| | |
|---|---|
| Angle of injection nozzle | 7 degrees from the acryl substrate surface |
| Pressure of injection nozzle | 6 kg/cm² |
| Particles for injection | Diamond (#150: 80~150 μm) |
| Injection amount of injection particles | 0.4 l/min |

FIG. 11 shows photos, taken by using a microscope, of three areas (30x, 30y, 30z; See FIG. 5a) on the surface of the light guiding panel 30 obtained by processing the acryl substrate by this method. As the distribution photos of the three areas show, while the distribution of recesses is 54 recesses per 1 mm² in the area 35x which is close to the light incident surface 30a, the numbers gradually increase in the inner areas 35y and 35z with 120 and 180, respectively. Also, it can be confirmed that the size of recesses gradually increases and the depth of recesses also gradually increases as a distance from the light incident surface 30 increases.

Figure 12:
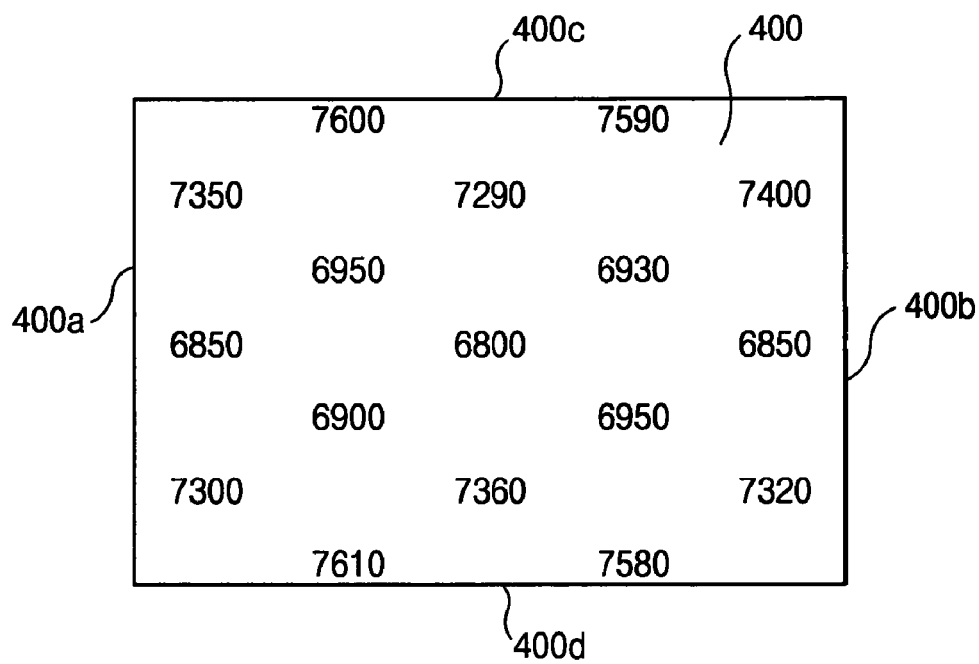
FIG. 12 is a diagram showing an illumination distribution measured when light is incident on both sides of a light guiding panel actually processed according to the present invention.

If light is incident on the light guiding panel manufactured thus, uniform optical brightness can be induced on the entire light guiding panel. FIG. 12 shows the result of measuring the illumination of the surface of the light guiding panel by making light incident on both light incident surfaces 400a and 400b of a light guiding panel manufactured through the process described above. The range of illumination was measured between maximum 7600 lux and minimum 6800 lux, and about 10% illumination deviation was observed.

Figure 13A:
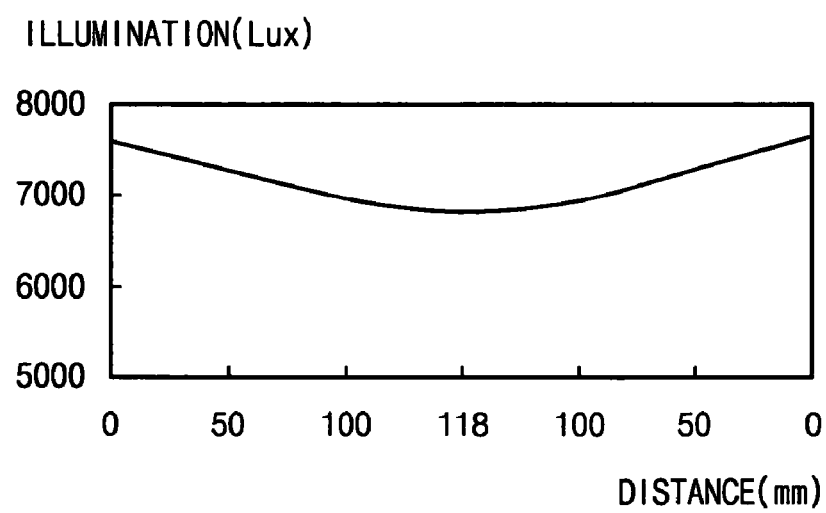
FIGS. 13a through 13d are graphs showing changes in illumination, the size of recesses, the depths of recesses, and the number of recesses, respectively, with respect to distance in a light guiding panel actually processed according to the present invention.
Figure 13B:
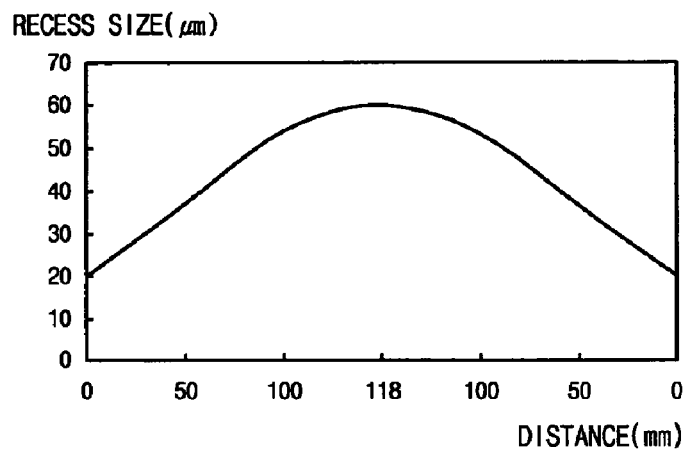
Figure 13C:
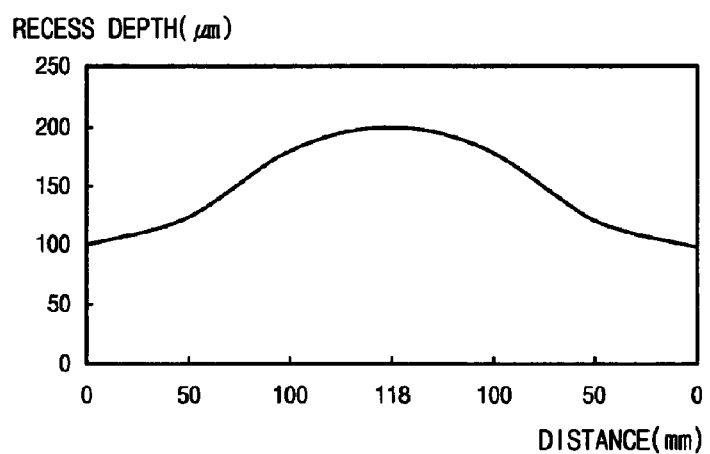
Figure 13D:
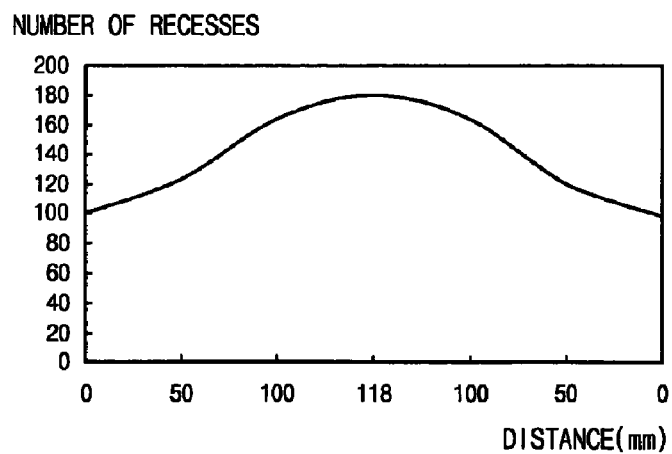

FIG. 13a shows the distribution of illumination with respect to distance from both light incident surfaces 400a and 400b. Though the center is seen a little dark, this degree of deviation is negligible. In addition, FIGS. 13b through 13d are graphs showing the size, depth, and number, respectively, of recesses with respect to distance from both light incident surfaces 400a and 400b. These graphs also confirm that the attributes of the recess profile, that is, the average size and average depth of the recesses, increase, as a distance from the light incident surfaces 400a and 400b increases, and the distribution density of the recesses also increases, as described above.

Though it is explained with a flat type light guiding panel as an example so far, the present invention is not limited by this type, and can also be applied to a wedge type light guiding panel.

Figure 14:
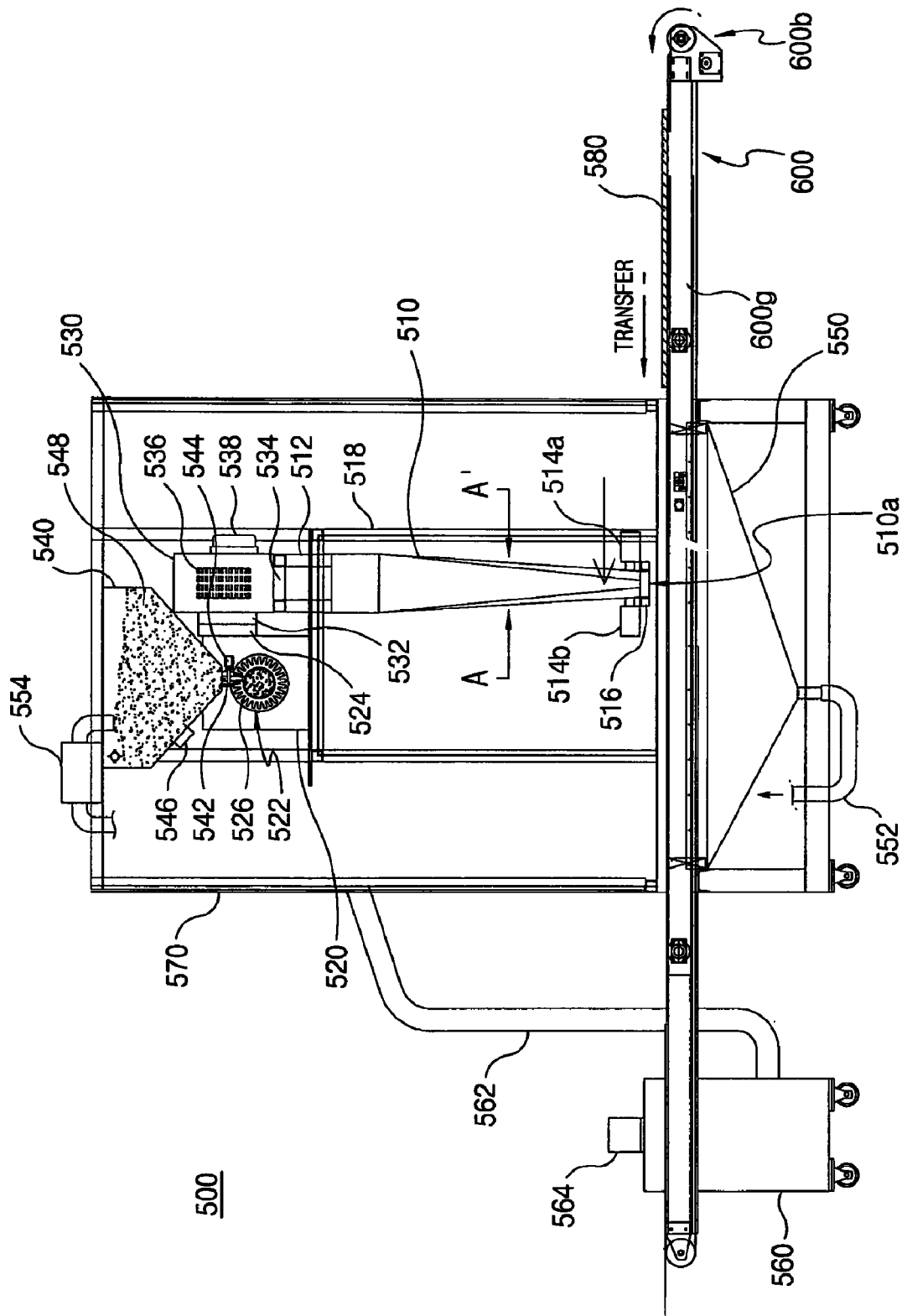
FIG. 14 is a side sectional view of the structure of a light guiding panel manufacturing apparatus according to a third preferred embodiment of the present invention.
Figure 15:
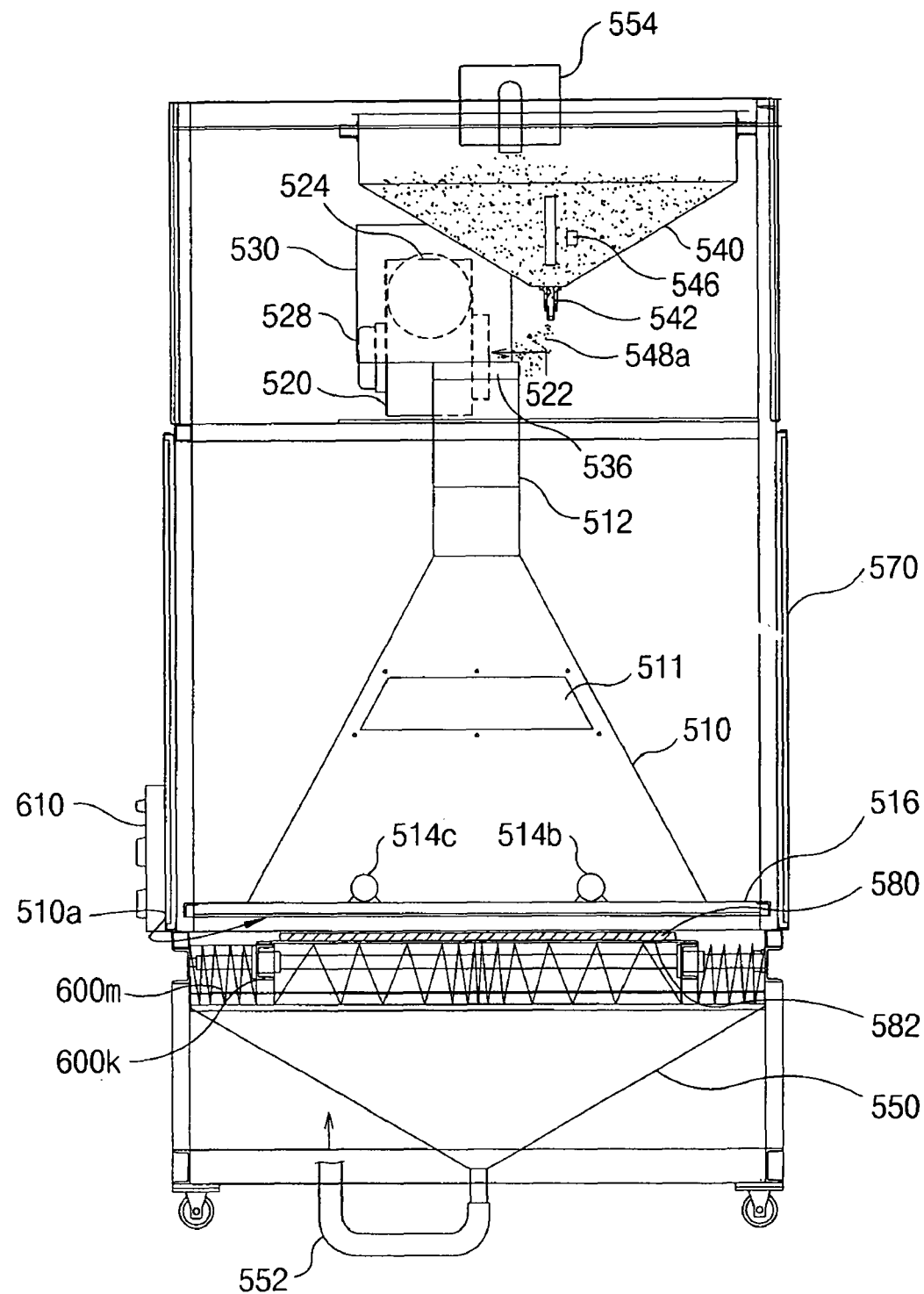
FIG. 15 is a front sectional view of the structure of a light guiding panel manufacturing apparatus according to the third preferred embodiment of the present invention.
Figure 16:
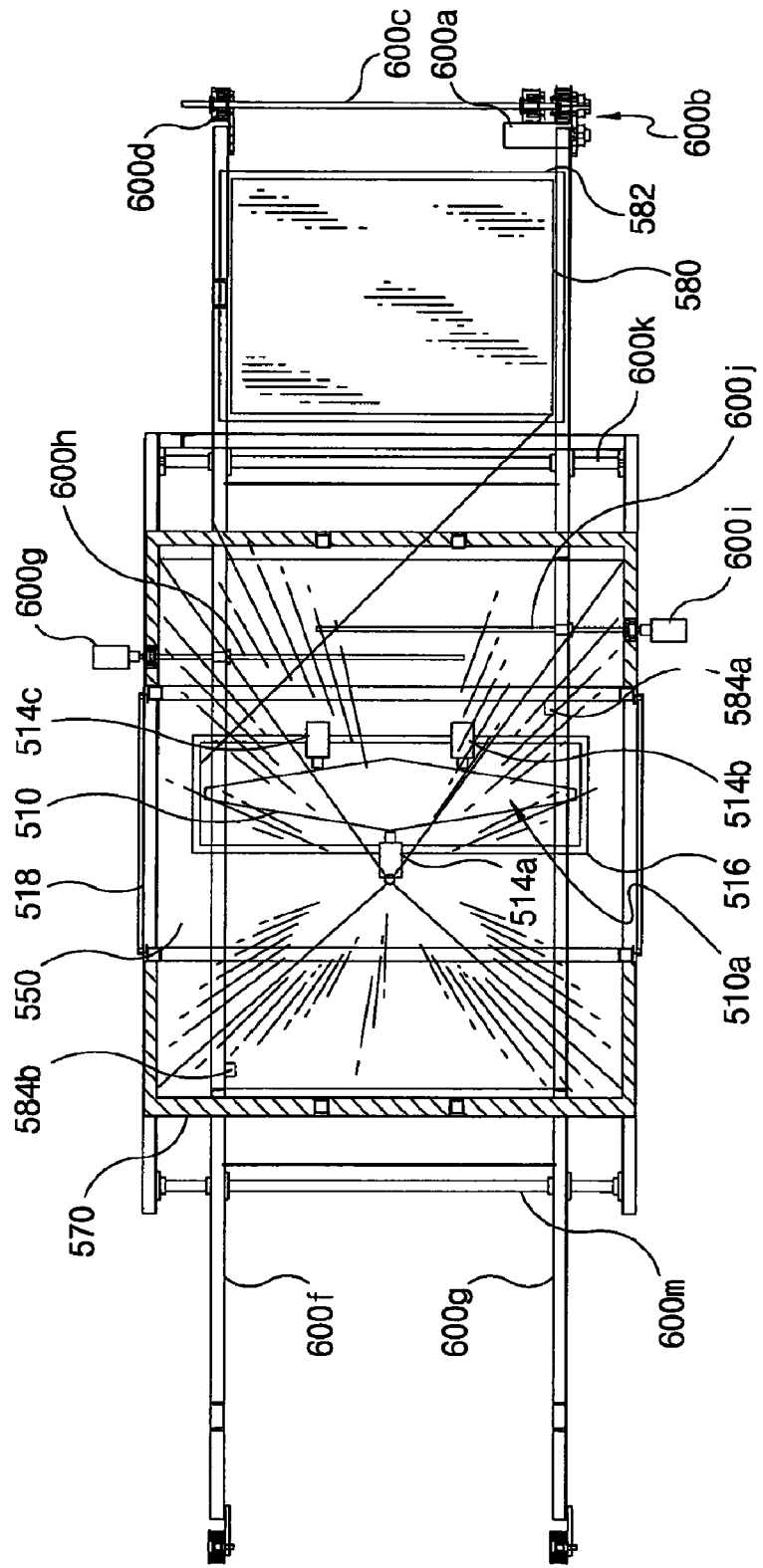
FIG. 16 is a plane view of the light guiding panel manufacturing apparatus shown in FIG. 14 which is seen from the outlet level of the injection pipe.
Figure 17:
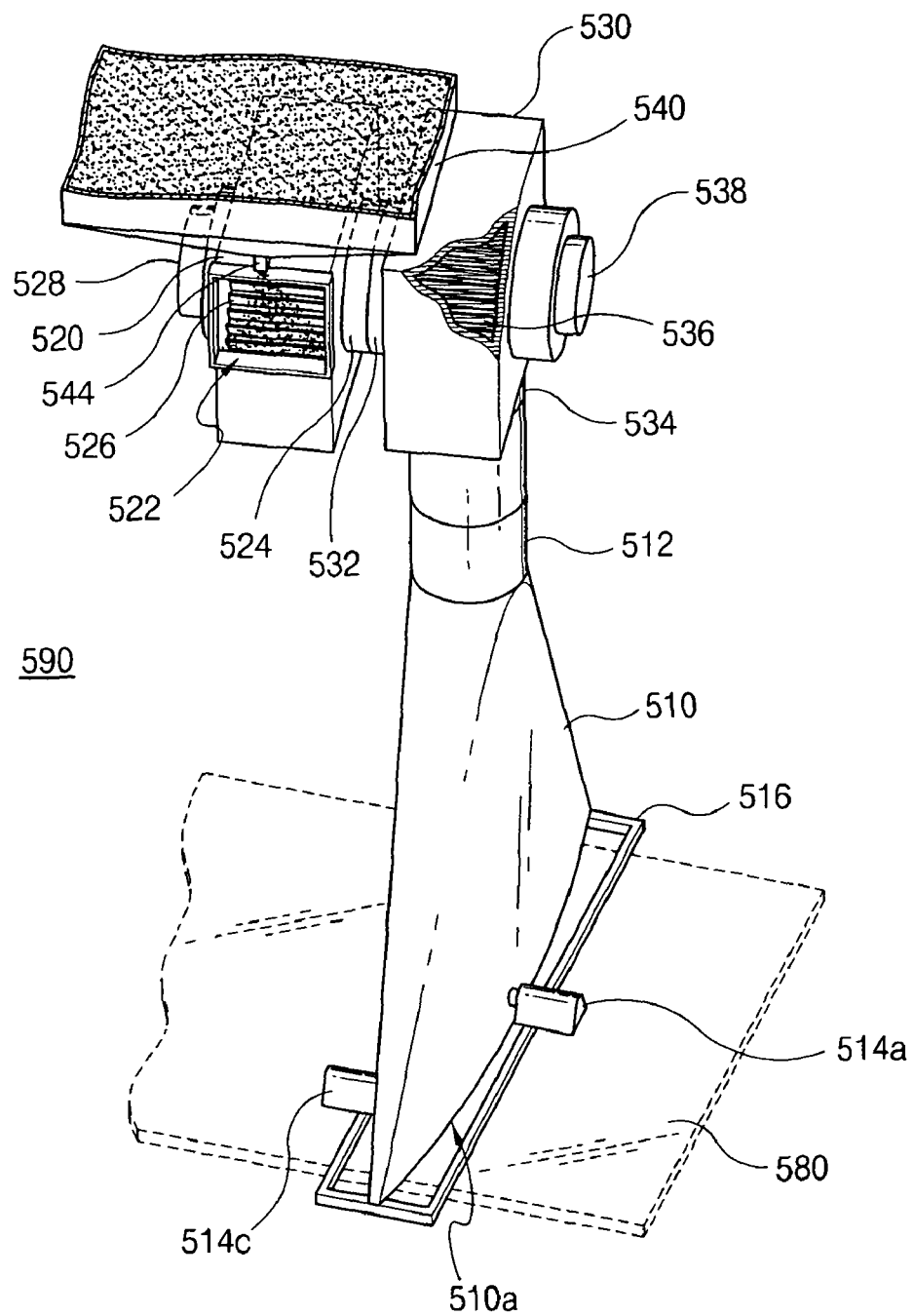
FIG. 17 is a perspective view of major parts of a particle injection apparatus of the light guiding panel manufacturing apparatus shown in FIG. 14.

Next, a third preferred embodiment of the present invention will now be explained. FIGS. 14, 15, and 16 are a side sectional view, a front sectional view, and a plane view, respectively, of the structure of a light guiding panel manufacturing apparatus 500 according to the third preferred embodiment of the present invention. The third embodiment uses a perpendicularly blasting method using a thin funnel-shaped pipe, and the light guiding panel manufacturing apparatus 500 broadly comprises a particle injection apparatus 590 and a transfer apparatus 600.

The transfer apparatus 600 transfers a transparent substrate 580 in one direction with the transparent substrate 580 placed on the transfer apparatus 600. The transfer apparatus 600 can be implemented as an ordinary conveyer system. More specifically, a pair of guide rails 600f and 600g that are extended in parallel with each other at a predetermined interval are provided and around the outer surfaces of the rails a transfer belt 600k is installed and rotating. At one end of the guide rail 600g, a motor 600a is installed, and gear assemblies 600b, 600c, and 600d, which are connected to the axis of the motor 600a and transfer the rotation power of the motor 600a to the transfer belt 600k of the two guide rails 600f and 600g so that the transfer belt 600k rotates, are provided. By perpendicularly penetrating the sides of the two guide rails 600f and 600g, guide bars 600k and 600m holds the guide rails 600f and 600g so that the two guide rails 600f and 600g maintain the predetermined interval, and at the same time, if external power is applied to the guide rail, the guide bars slide and support the guide rails so that the interval between the guide rails 600f and 600g can be accurately adjusted. In addition, motors 600g and 600i for adjusting the interval of the guide rails 600f and 600g, and gear axes 600h and 600j are provided. The gear axis 600h is extended in the direction of the axis of the motor 600g and coupled with the guide rail 600f with gears, while the gear axis 600j is extended in the direction of the axis of the motor 600i and coupled with the guide rail 600g with gears. If the gear axes 600h and 600i are rotated by driving the motors 600g and 600i, the guide rails 600f and 600g can be pulled or pushed such that the interval between the two guide rails can be adjusted. Preferably, the interval of the two guide rails 600f and 600g is designed so that a transparent substrate of a maximum size can be accommodated.

The transparent substrate 580 is placed on the transfer belt 600k winding at the external surface of the guide rails 600f and 600g. In order to prevent the transparent substrate 580 from being bent due to the strong injection pressure of minute particles, preferably, a support plate 582 that can stand a maximum injection pressure without being bent is placed first on the transfer belt 600k and then the transparent substrate 580 is put on the support plate 582.

In order to form a desired recess pattern on the transparent substrate 580, preferably, a function by which the transfer speed can be controlled variably is provided. For this, a control unit 610 for automatically controlling the transfer speed is provided. In addition, preferably, on an appropriate location on the transfer line, for example, in front of or at the back of the injection pipe 510, sensors 584a and 584b for sensing the passage of the transparent substrate 580 are installed. Using a sensing signal from the sensors 584a and 584b, the control unit 610 controls the transfer speed.

In order to fully automatize the light guiding panel manufacturing process, it is needed to expand the functions of the control unit 610. That is, all the motors provided for the apparatus of the present invention are implemented by servo motors and the apparatus can be constructed so that these servo motors are controlled by the control unit 610 having a function for automatically controlling the operations of the servo motors according to operating conditions set by a user.

The structure of the particle injection apparatus 590 will now be explained. The particle injection apparatus 590 comprises a container 540 which stores minute particles and discharges the minute particles in the air through free-falling through the outlet 542 at the bottom part to the air. Since the minute particles are free-falling from the container 540, the supply amount and injection amount of the minute particles are always constant with respect to time. This point is in common with the previous two embodiments. Preferably, an opening and shutting control unit 544 is installed at the outlet 542. This is for permitting discharge of minute particles by opening the outlet only when the apparatus is operating. This opening and shutting control unit 544 may be implemented by using, for example, a solenoid valve. Also, in order to facilitate smooth discharge of minute particles from the container 540, preferably, a vibrator 546 for vibrating the container 540 is installed on an appropriate location on the outer wall of the container 540.

Minute particles free-falling in the air from the container 540 should be evenly mixed with the high speed flow of air. For this, a mixing transfer unit which, by using an apparatus which generates a high speed air flow and discharge the air flow through the outlet, inhales free-falling minute particles through the entrance, mixes the particles with the high speed air flow, and forcibly discharges the mixed particles through the outlet, is provided. The mixing transfer unit may be implemented by using a blower. The figure shows a structure having two blowers 520 and 530 dependently connected. Each of the blowers 520 and 530 has a roughly cubic internal space with an open entrance 522 and 532 and an open outlet 524 and 534. A rotor 526 and 536 is installed inside the internal space and a motor 528 and 538, whose axis is coupled with the rotor 526 and 536 and which can rotate the rotor 526 and 536 at a high speed, is installed outside the cube. By the operation of the motors 528 and 538, the rotors 526 and 536 rotate at a high speed, and accordingly, the minute particles free-falling near the entrance 522 of the first blower 520 are pulled into the entrance 522, collided with the rotor 526 and with being mixed with high speed air flow, discharged through the outlet 524 at the right-hand side. The air-mixed minute particles discharged through the outlet 524 are again accelerated by the second blower 530 and discharged through the outlet 534. In addition to the structure shown in the figure, the mixing transfer unit may be constructed by using one blower or three or more blowers. Also, though not shown, by using a pipe member which has an aperture formed on the top part, and an air pressure apparatus, such as a compressor, which is connected to the back of the pipe member and supplies compressed air at a high speed to the outlet of the pipe member, the mixing transfer unit may be constructed.

Though injection nozzles are used in the previous two embodiments, the present embodiment is constructed such that minute particles discharged from the mixing transfer unit are injected through a thin-funnel-type injection pipe 510. The injection pipe 510 has an entrance 512 and an outlet 510a that are all open. The entrance 512 is connected to the outlet 534 of the mixing transfer unit. The internal sectional shape of the pipe 510 shows that the thickness decreases and the width increases in the direction to the outlet. Preferably, the outlet 510a of the injection pipe 510 is directed right below and the transparent substrate 580 passes through below the outlet 510a. After free-falling, minute particles are mixed with the high speed air flow and injected at a high speed through the injection pipe 510. The high speed minute particles provided by the mixing transfer unit pass the injection pipe 510 having this shape. Accordingly, the sectional shape formed by the group of minute particles injected from the outlet 510a can be defined by the internal sectional shape and by the sectional shape of the outlet 510 in particular. The sectional shape of the minute particle group of the injection pipe 510 is determined by a distribution pattern of recesses desired to be formed on the transparent substrate 580. In order to improve processing efficiency, preferably, with the transparent substrate 580 passing below the injection pipe 510 once, forming the desired recesses is completed. Considering this, preferably, the width of the outlet of the injection pipe 510 is made not less than the width of the transparent substrate 580.

Preferably, the outlet of the injection pipe 510 is arranged to cover the entire width of the transparent substrate 580 which passes below the injection pipe 510. At this time, since the distribution of recesses of the transparent substrate 580 varies with respect to locations on the surface of the transparent substrate 580, basically the distribution density of recesses should increase as a distance from the location of the optical source increases. Since the distribution density of recesses is proportional to the number of particles passing the inside of the injection pipe 510 in a unit time, the distribution of recesses can be adjusted by varying the shape of the pipeline, that is, the thickness of the injection pipe 510, in the width direction. When the thickness of the transparent substrate 580 is determined variably, the thickness of the injection pipe 510 corresponding to an area where the distribution density of recesses is high is made thick, while the thickness of the injection pipe 510 corresponding to an area where the distribution density is low is made thin.

Figure 18A:
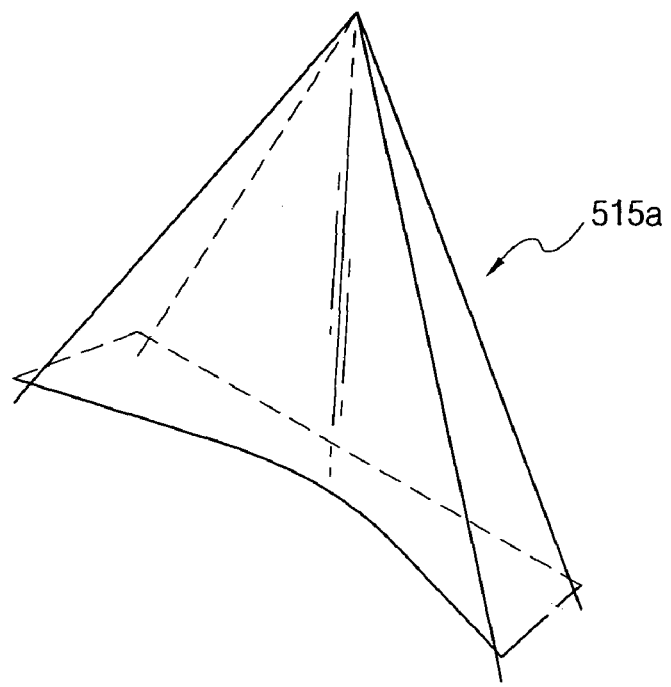
FIGS. 18a and 18b are examples of shapes of a pipeline adjusting member installed inside an injection pipe and FIGS. 18c through 18e are sectionals views taken along the cutting line A-A', of the inside of an injection pipe having a pipeline adjusting member.
Figure 18B:
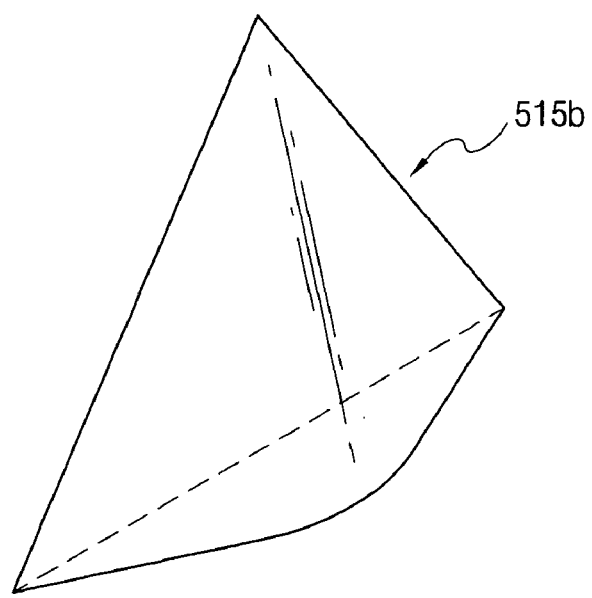

Meanwhile, the adjustment of the thickness of the pipeline of the injection pipe 510 can be achieved in a variety of ways. One method is adjusting the thickness of the outlet 510 of the injection pipe 510. For this, as shown in FIGS. 14 through 17, a support bar 516 is installed surrounding the outlet 510, servo motors 514a through 514c are installed on the support bar 516, and the axis of each motor is connected to a desired position on any one side or both sides. By operating these servo motors 514a through 514c, the thickness of the outlet 510a can be increased or decreased so that a desired shape is obtained. In another method for adjusting the thickness of the pipeline of the injection pipe 510, the thickness of the outlet 510a of the injection pipe 510 is put as is, and pipeline adjusting members 515a and 515b which are shown in FIG. 18a or 18b are arranged inside the injection pipe 510 so that the shape of the pipeline of the injection pipe 510 is formed as desired.

Figure 18C:
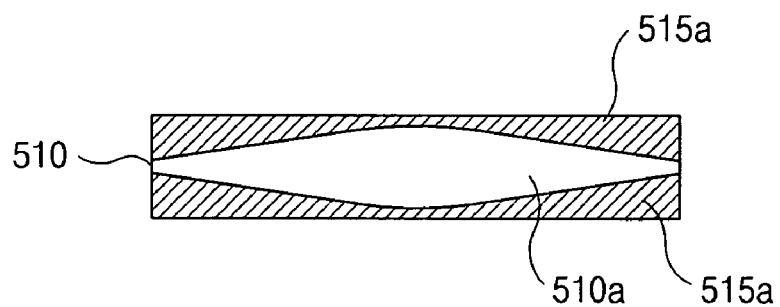
Figure 18D:
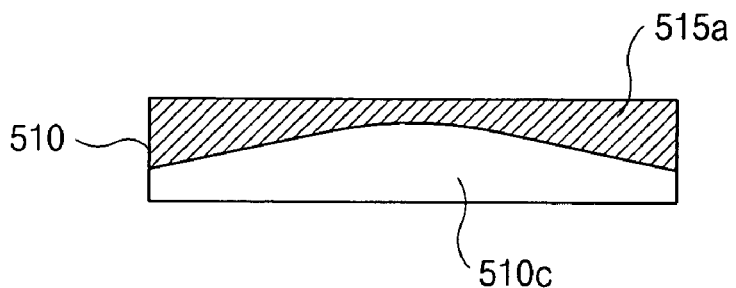
Figure 18E:
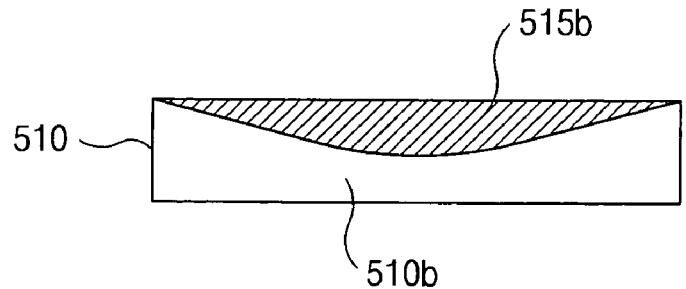

FIGS. 18c through 18e are sectional views of the injection pipe 510 taken along the cutting line A-A' of FIG. 14. FIG. 18c shows a case where two pipeline adjusting members 515a are installed inside the injection pipe 510. The pipeline adjusting member 515a has a thin center and the thickness increases in the side direction. By the pipeline adjusting members 515a, the sectional shape of the injection pipe 510 has a thick center and the thickness decreases in the side direction. FIG. 18d shows a sectional view of the injection pipe 510 when one pipeline adjusting member 515a is installed on the internal wall of the injection pipe 510. FIG. 18e shows a sectional view of the injection pipe 510 when a pipeline adjusting member, which has a thick center and its thickness decreases with increasing distance from the center, is installed inside the injection pipe 510. In the injection pipe 510, a window 511 for observing the state of the inside of the injection pipe 510 or installing a pipeline adjusting member may be formed.

This particle injection apparatus 590 is preferably installed inside a chamber in order to maintain a clean state of a workplace. The chamber 570 is placed on the transfer line of the transfer apparatus 600 and provides a roughly cubic space defined by side walls and a top surface and inside the chamber 570, the particle injection apparatus 590 is installed. The bottom part of the chamber 570 is open and exposed to the transparent substrate such that it induces free-falling of minute particles and dust collided with the transparent substrate 580.

When minute particles are collided with the transparent substrate 580, much dust is generated and floating inside the chamber 570. Accordingly, an appropriate measure to remove dust should be prepared. For this, it is preferable to install a dust removing apparatus 560 which by rotating the motor 564, inhales the air in the chamber 570 through a pipe 562 connected to the chamber 570 and makes the air pass through an internal filter (not shown) so that dust is removed.

For automation of the process, it is preferable that minute particles collided with the transparent substrate 580 is automatically collected and fed back to the container 510. For this, a particle collecting unit 550, which has a roughly funnel shape and is designed to collect free-falling minute particles in one place, is installed below the chamber 570, and the outlet of the particle collecting unit 550 is connected to a collection pump 554 through a collection pipe 552. Minute particles collected by the particle collecting unit 550 are fed back to the container 540 through an outlet pipe extended to the top part of the container 540 by pumping of a collection pump. In order to cut off emission of dust or minute particles, the bottom part of the chamber 570 and the top part of the particle collecting unit 550 are connected by a folding curtain 600m that can be extended or shortened with respect to the width of the transparent substrate 580.

The chamber 570, the minute particle feedback system 550, 552, and 554, and the dust removing system 560, 564, and 562 can be applied to construction of both the previous two embodiments.

Figure 19A:
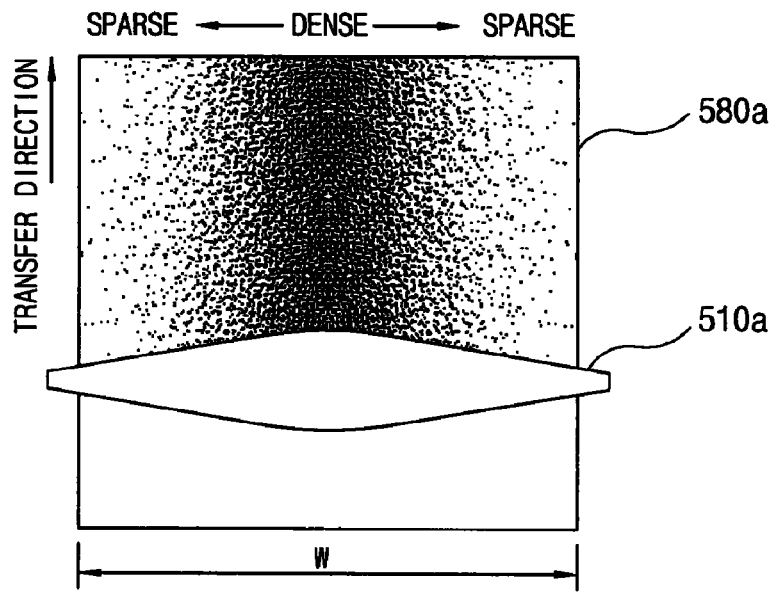
FIG. 19a shows a light guiding panel manufacturing method in which optical sources are arranged at two sides of a transparent substrate facing each other when the transparent substrate is processed by using the light guiding panel manufacturing apparatus shown in FIG. 14.
Figure 19B:
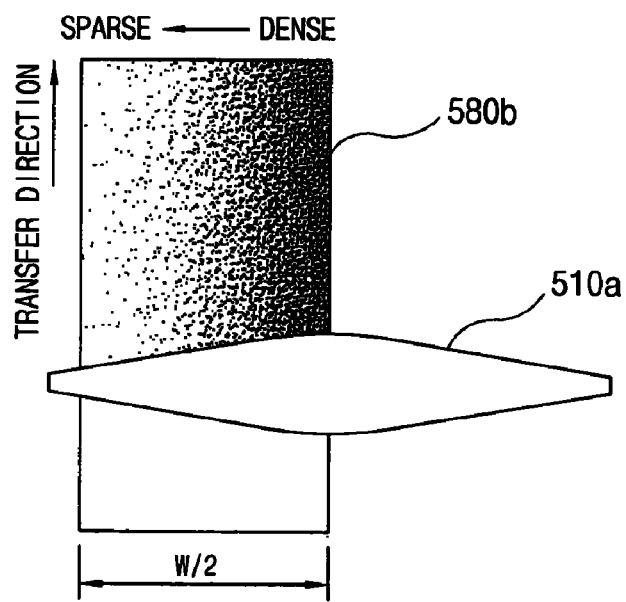
FIG. 19b shows another light guiding panel manufacturing method in which an optical source is arranged at only one side of the transparent substrate.
Figure 20A:
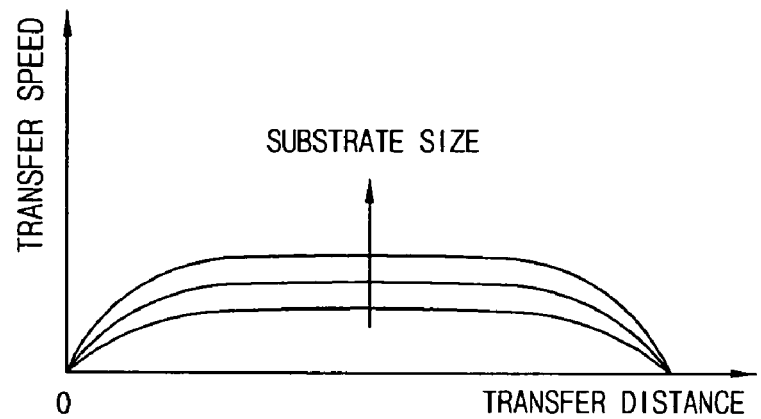
FIG. 20a is a graph showing the relations between the transfer distance and the transfer speed of a transparent substrate with respect to size of the transparent substrate.
Figure 20B:
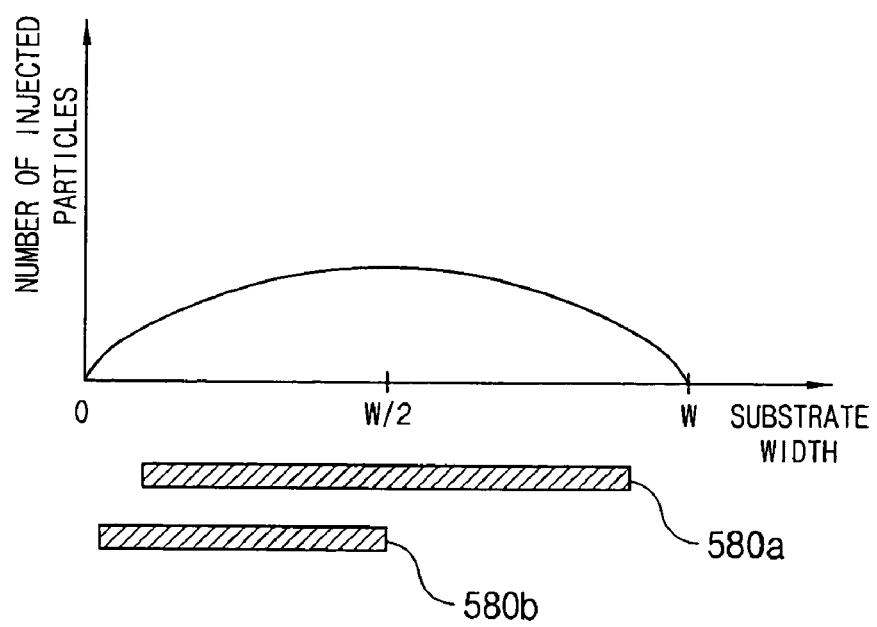
FIG. 20b is a graph showing the changes of outlet section area of an injection pipe in the width direction of a transparent substrate.

FIGS. 19a and 19b show cases where by using the light guiding panel manufacturing apparatus 500 according to the third embodiment, recess forming processing is performed on a transparent substrate. FIG. 19a shows a processing method when optical sources (not shown) are to be arranged at both the right-hand and left-hand sides of the transparent substrate 580a. Here, the distribution density of recesses should increase as a distance from any of both right-hand and left-hand edges of the transparent substrate to the center increases. In order to obtain this distribution, an injection pipe 510, in which the thickness of the center is greater than the thickness of either side, is used as the outlet 510a and the injection pipe 510 is arranged such that the thickest part of the injection pipe 510 corresponds to the center part of the transparent substrate 580a. FIG. 19b shows a processing method when an optical source (not shown) is to be arranged at only the left-hand side of the transparent substrate 580b. In this case, the distribution density of recesses (the number of injected minute particles) should increase as a distance from the right-hand edge decreases. For this, the injection pipe 510 is arranged such that the thickest part of the injection pipe 510 corresponds to the right-hand edge of the transparent substrate 580b. The relations between the number of injection particles and the location in the width direction in the above two cases are shown in FIG. 20b.

Meanwhile, when the arrangement of an optical source is considered in the examples of FIGS. 19a and 19b, if the distribution densities of recesses in the vicinity of the top edge and bottom edge of the transparent substrate are relatively higher than that of the center part, it is advantageous for obtaining uniform brightness, that is, for minimizing the H-beam effect described above. Considering this, and with respect to the transfer speed when the transparent substrate 580 passes below the injection pipe 510, it is needed that the transfer speed at which the vicinity of the top edge and bottom edge of the transparent substrate passes should be lower than the transfer speed at which the center part of the transparent substrate 580 passes, as shown in FIG. 20a.

Referring to preferred embodiments, the present invention has been explained above. However, the present invention is not limited to the preferred embodiments and variations and modifications can be effected within the spirit and scope of the present invention. For example, in the third embodiment, though the figure shows an example case where only one particle injection apparatus 590 is used, a plurality of particle injection apparatuses 590 along the transfer line can be arranged in order to improve productivity of light guiding panel manufacturing. In addition, the outlet of the injection pipe of each of the plurality of particle injection apparatuses can be made to have a different shape with a different width and/or thickness, that is, to have a different graph of FIG. 20b. If a production line is formed such that the transparent substrate 580 passes sequentially a particle injection apparatus having an injection pipe in which the thickness of the outlet rapidly changes and a particle injection apparatus having an injection pipe in which the thickness of the outlet gradually changes, each particle injection apparatus operate complementarily such that a desired recess distribution can be obtained quickly and in addition, a production line which can be elastically applied to a variety of sizes (the size of the transparent substrate 580 varies, for example, from A4 size to a substrate having a several meters long side) can be built. Also, for example, the number of dust removing apparatuses 560 to be installed may vary with respect to the amount of dust being generated. It is apparent to those skilled in the art that these variations and modifications are within the scope of the present invention.

INDUSTRIAL APPLICABILITY

Descriptions are given above for the apparatus and method according to the several embodiments of the present invention by which desired gradation patterns of the recesses reflecting the position of the light source lamp can be obtained. Any manufacturing method or apparatus described above assure that the particles can be discharged at a constant amount with time as well as can be accurately controlled to be discharged at a desired amount per time by means of the free-falling mechanism.

Furthermore, more accurate processing of the recesses can be performed by using adjustment of the interval, the discharge pressure and the angle of the discharge nozzles together with the adjustment of the discharge amount.

The manufacturing apparatus according to the present invention has a great advantages in realizing the automation and mass-production of a manufacturing process for the light guiding panel.

The present invention has a variety of advantages over the light guiding panels manufactured by the conventional silk-screen printing method or V-cut method.

Firstly, according to the light guiding panel having a recess profile proposed by the present invention, even without using a diffusion sheet, almost uniform planar light evenly diffused without deviation by an afterimage or spots is obtained through the front bottom surface of the light guiding panel.

Accordingly, if a backlight unit for an LCD panel is constructed using the light guiding panel of the present invention, a diffusion sheet is not needed. Also, if the light guiding panel is used for a backlight for an advertising film, the diffusion sheet is not needed either and the advertising film can be attached directly on the light guiding panel and be used. Since the diffusion sheet is not used, optical efficiency is greatly improved such that the screen of an LCD panel or an advertising film is shown very clearly. Particularly, since a clear advertising screen can be produced, it can be widely used as a high-grade advertising apparatus. In addition, since the diffusion sheet is not needed, the light guiding panel can be made a slimmer type.

Secondly, due to easiness of the manufacturing process, it is possible to produce enlarged light guiding panels. That is, by using the transfer apparatus, the manufacturing apparatus described above can continuously process light guiding panels to form recesses such that mass processing is possible and production cost can be reduced. A conveying velocity of the substrate, of course, can be used as an additional processing parameter. For making a light guiding panel with a large size, the conventional method requires a large manufacturing apparatus and difficult processes, but the present invention requires only increase of the number of the discharge nozzle.

Various changes in form and details may be made without departing from the spirit and scope of the present invention as defined by the appended claims. Therefore, it should be noted that all variations included in the meaning or scope equivalent to the claims are all included in the scope of the present invention.

The invention claimed is:

1. A method for manufacturing a light guiding panel comprising:
    transferring a transparent substrate that is a raw material for the light guiding panel, so that the substrate passes below an outlet of an injection pipe at a predetermined speed;
    making a predetermined amount of minute particles contained in a container free-fall in a unit time; and
    forming a desired distribution of recesses formed on a surface of the transparent substrate, by mixing the free-falling minute particles with a high speed compressed fluid flow, and injecting the mixed particles on the surface of the transparent substrate being transferred,
    wherein the minute particles are injected through the injection pipe that has an increased width and decreased thickness from an inlet to an outlet of the injection pipe, in which the injected minute particles form a desired distribution of recesses formed on the surface of the transparent substrate and the particles are injected in a belt shape that has a long width and a thickness relatively less than the width and has a changing trend in the width direction while there is a corresponding changing trend in the distribution density of the recesses formed.

2. The light guiding panel manufacturing method of claim 1, wherein the injection pipe is a thin funnel-shaped pipe and at the outlet of the injection pipe the thickness of the center is greater than the thickness of either side.

3. The light guiding panel manufacturing method of claim 1, wherein the width of the outlet of the injection pipe is not less than the width of the transparent substrate and the outlet of the injection pipe is arranged to cover the entire width of the transparent substrate which passes below the injection pipe.

4. The light guiding panel manufacturing method of claim 1, further comprising: adjusting the thickness of the outlet of the injection pipe so that a desired shape of the outlet of the injection pipe is made.

5. The light guiding panel manufacturing method of claim 4, wherein the adjusting of the thickness of the outlet is performed by driving a motor so as to increase or decrease the thickness of the outlet.

6. The light guiding panel manufacturing method of claim 4, wherein the adjusting of the thickness of the outlet is performed by installing a pipeline adjusting member inside the injection pipe to form a desired internal shape of the injection pipe.

7. The light guiding panel manufacturing method of claim 1, further comprising: collecting minute particles collided with the transparent substrate and feeding the minute particles back to the container.

8. The light guiding panel manufacturing method of claim 1, further comprising: varying the transfer speed of the transparent substrate with respect to distribution of the recesses in the transfer direction of the transparent substrate.

9. The light guiding panel manufacturing method of claim 1, wherein the minute particles are injected through a process in which the minute particles contained in the container are made to free-fall in the air, the free-falling minute particles are inhaled into a ventilating means which generates a high speed air flow, and the high speed air flow and minute particles are evenly mixed.

* * * * *

UNITED STATES PATENT AND TRADEMARK OFFICE
CERTIFICATE OF CORRECTION

| | | |
|---|---|---|
| PATENT NO. | : 8,206,634 B2 | Page 1 of 1 |
| APPLICATION NO. | : 10/509819 | |
| DATED | : June 26, 2012 | |
| INVENTOR(S) | : Myoung | |

It is certified that error appears in the above-identified patent and that said Letters Patent is hereby corrected as shown below:

Title Page; please insert;

-- (73) Assignee:

Hunatech Co., Ltd.
Gyeonggi-do, Rep. of Korea --

Signed and Sealed this
Twenty-third Day of October, 2012

David J. Kappos
*Director of the United States Patent and Trademark Office*